United States Patent [19]
Watanabe

[11] Patent Number: 5,797,467
[45] Date of Patent: Aug. 25, 1998

[54] DEVICE FOR PREVENTING AN ACCELERATOR OF A VEHICLE FROM BEING ERRONEOUSLY OPERATED

[76] Inventor: Masaei Watanabe, 61-13 Mitsufuji 1-chome, Musashimurayama-shi, Tokyo, Japan

[21] Appl. No.: 581,515

[22] PCT Filed: May 17, 1995

[86] PCT No.: PCT/JP95/00939
  § 371 Date: Jan. 11, 1996
  § 102(e) Date: Jan. 11, 1996

[87] PCT Pub. No.: WO95/31349
  PCT Pub. Date: Nov. 23, 1995

[30] Foreign Application Priority Data

May 17, 1994 [JP] Japan .................................. 6-137772

[51] Int. Cl.$^6$ .................................. B60D 1/12
[52] U.S. Cl. .................. 180/271; 74/501.5 R; 74/512; 74/560; 180/315; 403/DIG. 1
[58] Field of Search .................. 180/271, 282, 180/284, 315; 403/DIG. 1, 49; 74/560, 512, 501.5 R, 513

[56] References Cited

U.S. PATENT DOCUMENTS 5,193,640  3/1993  Lee .......................... 180/271

FOREIGN PATENT DOCUMENTS

| 2469312 | 5/1981 | France .................................. 180/315 |
| 61-190135 | of 1986 | Japan . |
| 60-31928 | 2/1986 | Japan . |
| 115734 | of 1989 | Japan . |
| 1-202534 | 8/1989 | Japan .................................. 180/271 |
| 2-41940 | 2/1990 | Japan .................................. 180/271 |
| 3-129747 | 12/1991 | Japan . |
| 139183 | of 1993 | Japan . |
| 185862 | of 1993 | Japan . |
| 5-181557 | 7/1993 | Japan .................................. 74/513 |

*Primary Examiner*—Eric D. Culbreth
*Attorney, Agent, or Firm*—Pearne, Gordon, McCoy & Granger LLP

[57] ABSTRACT

A device for preventing an accelerator from being erroneously operated when an accelerator pedal of a motor vehicle is erroneously pushed down includes a magnetic coupling device comprising an accelerator interlocking member interlocking with an accelerator pedal and a throttle interlocking member connected to a throttle cable. When the accelerator pedal is pushed down during normal operation the throttle cable is operated through the magnetic coupling device to cause the motor vehicle to be accelerated. When the accelerator pedal (14) is erroneously pushed down in spite of the brake pedal being intended to be pushed down, the magnetic coupling device decouples and prevents the throttle valve from being operated and the motor vehicle from being accelerated.

33 Claims, 23 Drawing Sheets

DEVICE FOR PREVENTING AN ACCELERATOR OF A VEHICLE FROM BEING ERRONEOUSLY OPERATED

TECHNICAL FIELD

This invention pertains to a device for preventing an accelerator of a vehicle such as a gasoline engine automobile or an electric vehicle having an automatic transmission from being erroneously operated. This is done by stopping an accelerating operation when the accelerator pedal is erroneously pushed down in order to prevent the vehicle from being accelerated even though the accelerator pedal is pushed down in spite of the vehicle being intended to be braked.

BACKGROUND OF THE INVENTION

On operating a vehicle such as a gasoline engine vehicle having an automatic transmission mounted thereon, when an accelerator pedal is erroneously pushed down even though a brake pedal is intended to be pushed down for braking the vehicle, it is not stopped, but is accelerated, which should be avoided.

Various devices have been proposed in order to avoid the vehicle from being unwillingly accelerated by an erroneous operation of the pedal. The prior art devices are adapted to basically prevent the vehicle from being accelerated by a fuel system, an air intake system or an ignition system of an engine failing to be operated, which is instructed by an electric signal which is in turn generated by electrically detecting that the accelerator pedal in place of a brake pedal is erroneously pushed down.

For example, Japanese Laying-Open No. 190,135/1986 (Japan 61-190,135), Japanese Laying-Open No. 115,734/ 1989 (Japan 1-115,734) or Japanese Laying-Open No. 139, 183/1993 (Japan 5-139,183) discloses a device adapted to fail to operate one of the aforementioned systems of the engine, which is instructed by an electric signal generated by determining and electrically detecting an erroneous operation of the accelerator pedal in place of the brake pedal when a pedalling force of the accelerator or a pedalling velocity thereof considerably exceeds a normal value.

However, since such prior art devices electrically detect the erroneous operation of the pedal and thereafter prevent an engine from being accelerated in accordance with the electric signal, they disadvantageously have a time delay after the accelerator pedal is pushed down until the engine is prevented from being accelerated. Since the prior art devices require erroneous operation detecting means to determine the erroneous operation of the pedal to generate the electric signal and engine operation disabling means to make the fuel system, the air intake system or the ignition system of the engine disabled in accordance with the electric signal from the erroneous operation detecting means, the construction of the devices is complicated. Furthermore, if the air intake system or the ignition system is disabled while the accelerator pedal continues to be pushed down, then raw gas is undesirably exhausted from the engine. In addition thereto, since the engine is stopped, the engine continues to be stopped even though the accelerator pedal is released and therefore, the vehicle cannot be driven unless the engine is again started.

Japanese Laying-Open No. 185862/1993 (Japan 5-185862) discloses a device for preventing an engine from being accelerated. Normal operation of the accelerator is provided by interengaging an accelerator rod on which an accelerator pedal is mounted with a cable operating plate connected to a throttle cable so that the accelerator rod is interlocked with the throttle cable, and the engine is prevented from being accelerated by disengaging the accelerator rod from the cable operating plate so that the throttle cable is released from the accelerator rod.

Although the prior art device of Japanese Laying-Open No. 185862/1993 releases the throttle cable from the accelerator pedal in accordance with the erroneous operation of the accelerator pedal in place of the brake pedal, the engine tends to be prevented in a delay time from being accelerated because the accelerator erroneous operation preventing device is never operated unless the accelerator pedal is pushed down while the distance for which the accelerator pedal is pushed down exceeds a predetermined value. Also, the accelerator rod is unstably interlocked with the cable operating plate during the normal operation of the accelerator. Particularly, if the device is so constructed that the accelerator rod is easily again engaged with the cable operating plate in order to return the normal operation of the accelerator after the cable operation plate is released from the accelerator rod, then both of the accelerator rod and the cable operating plate tend to be more unstably interlocked with each other.

On operating the vehicle having an automatic transmission mounted thereon, the accelerator pedal is sometimes erroneously and abruptly pushed down in spite of a brake being intended to be operated while a driver operates the vehicle without contacting the accelerator pedal. In any of the aforementioned prior art arrangements, such erroneous operation of the accelerator causes the throttle cable to be pulled so that a throttle valve is opened in a direction in which the engine is accelerated, and thereafter, the throttle cable is released so that the throttle valve is closed. This causes the engine to be prevented during a time delay from being accelerated.

An electric vehicle is driven by controlling a drive motor which rotates and drives wheels by a controller. The speed of the electric vehicle is conventionally controlled by supplying to the controller a speed control signal generated in association with an accelerator pedal. If the accelerator pedal is erroneously pushed down in place of the brake pedal, the speed control signal indicating acceleration is supplied to the controller. Thus, the electric vehicle is driven at higher speed rather than braked because the drive motor is accelerated.

Accordingly, it is one object of the invention to provide a device for preventing an erroneous operation of an accelerator for a vehicle adapted to not accelerate the vehicle even though the accelerator pedal is erroneously pushed down in spite of a brake pedal being intended to be pushed down. The device is adapted to immediately stop the erroneous operation of the accelerator without time delay when the erroneous operation of the accelerator is detected.

It is another object of the invention to provide a device for preventing an erroneous operation of an accelerator for a vehicle adapted to immediately stop the accelerating operation when the accelerator pedal is erroneously further pushed down in spite of a brake pedal being intended to be pushed down while a driver operates the vehicle with the accelerator pedal being pushed down.

It is a further object of the invention to provide a device for preventing an erroneous operation of an accelerator for a vehicle adapted to immediately stop the accelerating operation without having almost any condition of pushing down the accelerator pedal in an accelerating direction even though the accelerator pedal is erroneously pushed down in spite of a brake pedal being intended to be pushed down while a driver operates the vehicle without contacting the accelerator pedal.

It is a further object of the invention to provide a device for preventing an erroneous operation of an accelerator for a vehicle adapted to normally operate the vehicle as soon as the accelerator pedal is released from a foot of the driver to immediately return the original condition of the accelerator system after the erroneous operation of the accelerator is prevented.

It is a further object of the invention to provide a device for preventing an erroneous operation of an accelerator for an electric vehicle adapted to immediately stop the accelerating operation when the accelerator pedal is erroneously pushed down in spite of a brake being intended to be pushed down.

DISCLOSURE OF THE INVENTION

A first feature of the invention is to provide magnetic coupling means comprising an accelerator interlocking member interlocking with an accelerator pedal of a vehicle and a throttle interlocking member associated with a throttle valve so as to open and close the throttle valve and being magnetically coupled with the accelerator interlocking member. The magnetic coupling means is magnetically set or arranged so that the accelerator interlocking member is released from the throttle interlocking member as soon as a pedalling force equal to or more than a pedalling force applied to a brake pedal is abruptly applied to the accelerator pedal.

Either of the accelerator interlocking member and the throttle interlocking member for the magnetic coupling means may include magnetic material while the other may include a magnet, but both of the accelerator interlocking member and the throttle interlocking member may comprise a magnet. Preferably, the accelerator interlocking member may include an attraction plate of magnetic material while the throttle interlocking member may include a magnet facing to the attraction plate and serving to magnetically attract the attraction plate. The magnetic coupling means is preferably provided on an accelerator arm pivotally mounted on a body of the vehicle and having the accelerator pedal mounted thereon so that the magnetic coupling means is positioned on the side of the accelerator arm opposite to the accelerator pedal relative to a pivotal point of the accelerator arm.

When a pedalling force equal to or more than a pedalling force applied to a brake pedal is abruptly applied to the accelerator pedal in spite of a brake being intended to be applied on a vehicle having an automatic transmission mounted thereon when it is driven without contacting the accelerator pedal, a mass of the throttle interlocking member and an urging force applied to the throttle interlocking member through a throttle cable serve to resist movement of the throttle interlocking member in an accelerating direction. Also, the leverage of the accelerating arm serves to separately release the accelerator interlocking member from the throttle interlocking member sequentially toward the pivotal point of the accelerator arm from a point of the accelerator interlocking member remote therefrom. Thus, the accelerator interlocking member is immediately moved far away from the throttle interlocking member and the accelerator interlocking member moves in association with the accelerator pedal while the throttle interlocking member is kept at its original position. This prevents a part such as a throttle cable or the like, interlocking a throttle valve with a throttle interlocking member from being pulled so that the throttle valve is opened, and therefore the accelerator from being operated.

A second feature of the invention is to provide magnetic coupling means comprising an accelerator interlocking member interlocking with an accelerator pedal of a vehicle and a throttle interlocking member associated with a throttle valve so as to open and close the throttle valve, the interlocking members being magnetically coupled, and stop means are provided to be engaged against the throttle interlocking member at the pedalling position of the accelerator where the accelerator interlocking member exceeds the furthermost pedalling position of the normal accelerating operation to release the accelerator interlocking member from being magnetically coupled with the throttle interlocking member.

Also, in this magnetic coupling means, either of the accelerator interlocking member and the throttle interlocking member may include magnetic material while the other may include a magnet, but both of them may include a magnet.

The stop means may comprise a first stop member to stop further pushing down the accelerator pedal in the normal operation of the accelerator and a second stop member serving to stop movement of the throttle interlocking member in the accelerating direction so that it is released from the condition of being magnetically coupled with the accelerator interlocking member when the accelerator pedal is pushed down beyond the normal accelerating operation while the first stop member is deformed. The first stop member may be formed of resilient material such as hard rubber or the like which is deformed by pushing down the accelerator pedal beyond the normal accelerating operation, or it may be formed of plastically deformable material such as hard glass or the like which is plastically deformed to allow the accelerator interlocking member to be moved to a position where the accelerator interlocking member is released from being magnetically coupled with the throttle interlocking member by pushing down the accelerator pedal beyond the normal accelerating operation.

While the accelerator is normally operated, even though the accelerator pedal is furthermost pushed down, the part on the side of the accelerator interlocking member is engaged against the first stop member so that the accelerator is normally operated. While the accelerator is normally operated like this, the accelerator pedal sometimes continues to be erroneously pushed down with a pedalling force equal to or more than the pedalling force applied to the brake pedal in spite of the brake pedal being intended to be operated. In such a case, the part on the side of the accelerator interlocking member is firstly engaged against the first stop member, but when the accelerator pedal is strongly pushed down in the same manner as the brake pedal, the first stop member is deformed until the accelerator interlocking member is moved beyond the second stop member. Thus, since the throttle interlocking member is stopped by the second stop member and cannot be moved beyond it, the accelerator interlocking member moves beyond the second stop member with the throttle interlocking member being left at the second stop member while the accelerator interlocking member is released from being magnetically coupled with the throttle interlocking member. Since the throttle interlocking member is returned to the position where the accelerator is released, which is caused by the throttle cable or the like connected to the throttle valve and being urged so that the throttle valve is normally closed, an erroneous operation of the accelerator can be prevented.

The magnetic coupling means of the second feature of the invention may be so magnetically set that the accelerator interlocking member is released from the throttle interlocking member as soon as a pedalling force equal to or more than a pedalling force applied to a brake pedal is abruptly applied to the accelerator pedal in the same manner as the magnetic coupling means of the first feature of the invention.

In the same manner as in the first feature of the invention, when the pedalling force equal to or more than the pedalling force applied to the brake pedal is abruptly applied to the accelerator pedal in spite of a brake being intended to be applied on a vehicle having an automatic transmission mounted thereon when it is driven without contacting the accelerating pedal, the accelerator interlocking member is immediately released from the throttle interlocking member, which is based on a mass of the throttle interlocking member, an urging force applied thereto and a principle of leverage acting to the accelerator arm and therefore the accelerator is prevented from being operated.

In either of the first and second features of the invention, if there is not required a function of preventing the erroneous operation of the accelerator, then the accelerator interlocking member may be locked with the throttle interlocking member so that both of them are never released from the magnetic coupling condition.

In either of the first and second features of the invention, at the same time when the accelerator interlocking member and the throttle interlocking member are released from the magnetic coupling condition so as to prevent the erroneous operation of the accelerator, switch means may electrically detect that the accelerator interlocking member and the throttle interlocking member are released from the magnetic coupling condition and thereby the erroneous operation of the accelerator may be warned in accordance with the accelerator erroneous operation signal. A warning may be preferably a speech of "Please release a foot from the accelerator pedal." or the like from a speech synthesis system as well as a warning sound from a buzzer or the like.

A third feature of the invention is to provide magnetic coupling sensor means comprising an accelerator interlocking member interlocking with an accelerator pedal of an electric vehicle, a follower member magnetically coupled with the accelerator pedal while urged to be moved in a direction opposite to an accelerating direction of an accelerator arm to be moved following the accelerator interlocking member and a switching element to detect when the accelerator interlocking member and the follower member are released from the magnetic coupling condition to generate an accelerator erroneous operation signal. The magnetic coupling sensor means is so magnetically set that the accelerator interlocking member is released from the follower member as soon as a pedalling force equal to or more than a pedalling force applied to a brake pedal is abruptly applied to the accelerator pedal and is connected to a controller of the electric vehicle so that the accelerator erroneous operation signal from the switching element serves to prevent the controller from controlling the vehicle in an accelerating direction thereof.

Either of the accelerator interlocking member and the follower member for the magnetic coupling sensor means may include magnetic material while the other may include a magnet, but both of them may comprise a magnet. Preferably, the accelerator interlocking member may include an attraction plate of magnetic material while the follower member may include a magnet facing to the attraction plate and serving to magnetically attract the attraction plate. The magnetic coupling sensor means may be preferably provided on the accelerator arm pivotally mounted on a body of the vehicle and having the accelerator pedal so that the magnetic coupling sensor means is positioned on the side of the accelerator arm opposite to the accelerator pedal relative to a pivotal point of the accelerator arm.

When the pedalling force equal to or more than the pedalling force applied to the brake pedal is erroneously and abruptly applied to the accelerator pedal in spite of the electric vehicle being intended to be braked when it is driven without contacting the accelerator pedal, the accelerator interlocking member is immediately released from the follower member and therefore the switching element generates the accelerator erroneous operation signal, which causes the controller of the electric vehicle to stop controlling the vehicle in the accelerating direction in the same manner as described in details with respect to the first feature of the invention.

The fourth feature of the invention is to provide stop means to stop the follower member from moving to the accelerator pedalling position where the accelerator interlocking member exceeds the pedalling position of the normal accelerator operation to release the accelerator interlocking member from being magnetically coupled with the follower member in addition to the same magnetic coupling sensor means as in the third feature of the invention.

The stop means may comprise a first stop member to stop further pushing down the accelerator pedal in the normal accelerating operation and a second stop member serving to stop moving the follower member in the accelerating direction so that it is released from the condition of being magnetically coupled with the accelerator interlocking member when the accelerator pedal is pushed down beyond the normal accelerating operation while the first stop member is deformed. The first stop member may be formed of resilient material such as hard rubber or the like that is deformed by pushing down the accelerator pedal beyond the normal accelerating operation or may be formed of plastically deformable material such as hard glass or the like that is plastically deformed to allow the accelerator interlocking member to be moved to a position where the accelerator interlocking member is released from being magnetically coupled with the follower member by pushing down the accelerator pedal beyond the normal accelerating operation.

While the accelerator is normally operated, even though the accelerator pedal is furthermost pushed down, the part on the side of the accelerator interlocking member is never strongly engaged against the first stop member so that the normal operation of the accelerator is allowed. While the accelerator is normally operated like this, if the accelerator pedal sometimes continues to be operated with the pedalling force equal to or more than the pedalling force applied to the brake pedal in spite of the brake pedal being intended to be operated, then the part on the side of the accelerator interlocking member is first engaged against the first stop member with an abnormal force. Thus, only the accelerating interlocking member moves while the follower member is left and therefore it is released from being magnetically coupled with the follower member to generate the accelerator erroneous operation signal from the switching element. Accordingly, the controller never controls the vehicle in the accelerating direction.

BRIEF DESCRIPTION OF THE DRAWINGS

3 is a side elevational view of the accelerator system having the device of FIG. 1 moved to the furthermost pedalling position of a normal operation of the accelerator, with a portion taken in section as in FIG. 1.

DETAILED DESCRIPTION OF THE INVENTION

Figure 1:
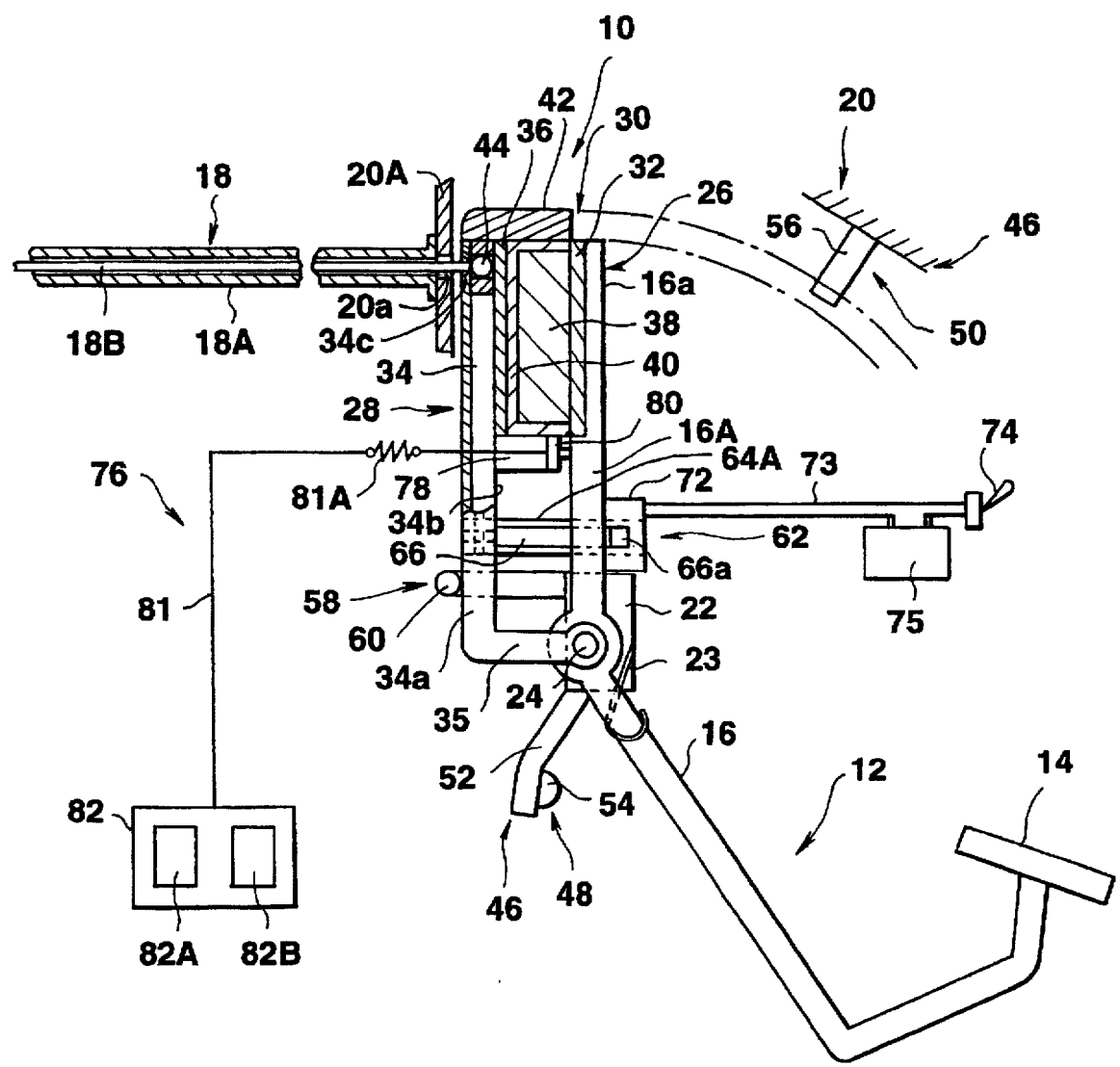
FIG. 1 is a side elevational view of an accelerator system having a device for preventing an accelerator from being erroneously operated in accordance with a first embodiment of the invention, with a portion thereof taken in section.

Some preferred embodiments of the invention will be described in detail with reference to the accompanying drawings.

A typical embodiment (a first embodiment) of the invention is shown in FIGS. 1 through 8. A gasoline engine motor vehicle to which the invention is applied is in the form of one having an automatic transmission mounted thereon. An accelerator system 12 having a device 10 for preventing an accelerator from being erroneously operated in accordance with the embodiment of the invention comprises an accelerator arm 16 having an accelerator pedal 14 mounted on and connected to a throttle cable 18, which serves to open and close a throttle valve (not shown) through the accelerator erroneous operation preventing device 10 of the invention.

As conventional, the throttle cable 18 comprises an outer case 18A having its end secured to wall 20A of a vehicle body 20 and a cable body 18B slidably disposed within the outer case 18A. The cable body 18B is urged by a spring (not shown) or the like in a leftward direction as viewed in FIG. 1 so as to normally close the throttle valve. The accelerator arm 16 is in the form of lever pivotally mounted by a support shaft 24 on a base 22 which is in turn secured to a portion of the vehicle body 20 by suitable means.

Figure 2:
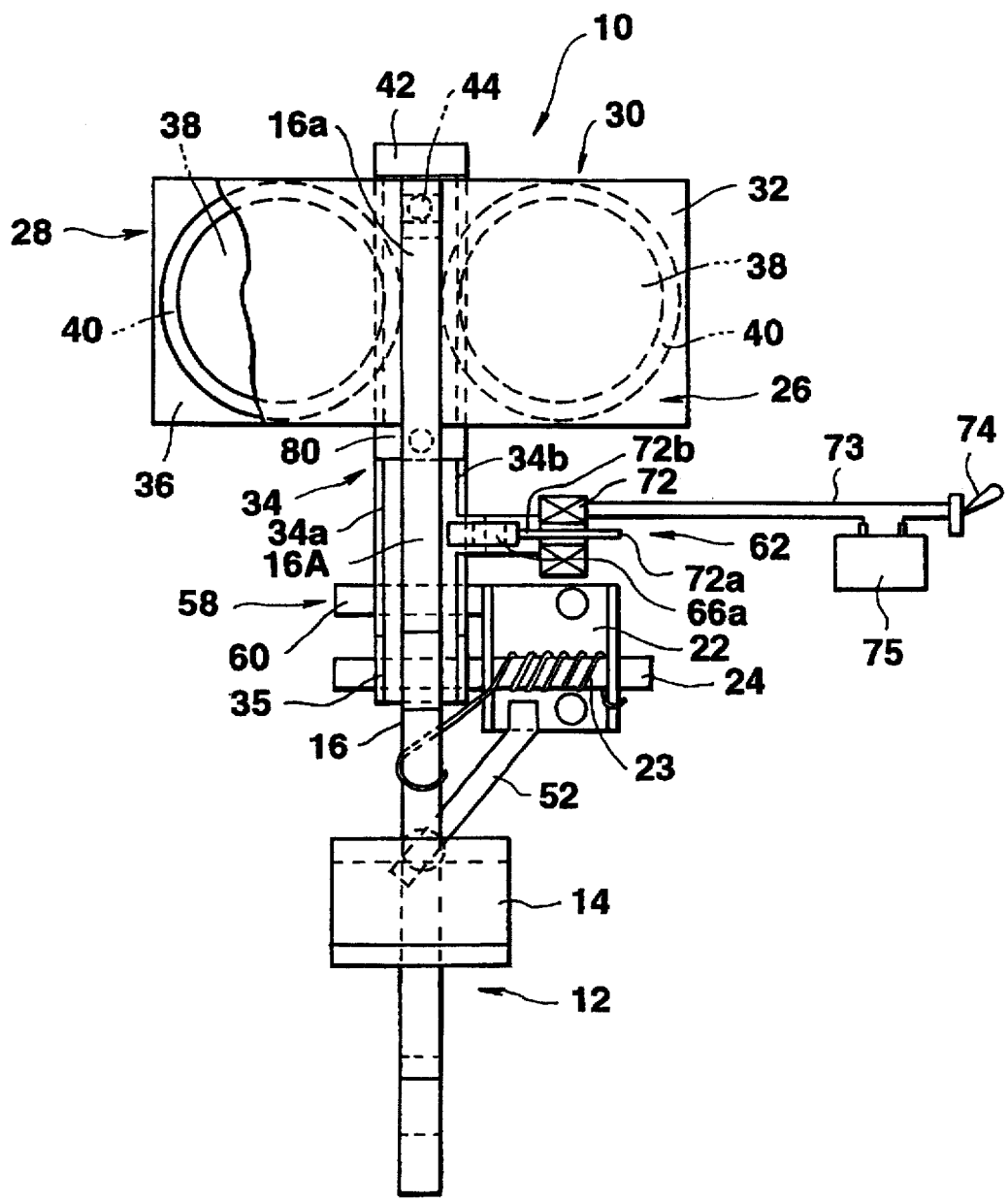
FIG. 2 is a front view of the accelerator system of FIG. 1; FIG.

As shown in FIG. 2, a coil spring 23 is wound around the portion of the support shaft 24 extending through the base 22. One of ends of the coil spring 23 may be hooked on the base 22 while the other end of the coil spring 23 may be hooked on a rear face of the accelerator arm 16 (a lefthand face of FIG. 1). Thus, the accelerator pedal 14 is urged in an upward direction as viewed in FIG. 1.

The accelerator erroneous operation preventing device 10 constructed in accordance with the first embodiment of the invention is provided with magnetic coupling means 30 comprising an accelerator interlocking member 26 mounted on the accelerator arm 16 and a throttle interlocking member 28 associated with the throttle valve so as to open and close the throttle valve and being magnetically coupled with the accelerator interlocking member 26.

In the illustrated embodiment, the magnetic coupling means 30 may be provided on a portion (an upper half portion) 16A of the accelerator arm 16 opposite to the accelerator pedal 14 relative to the pivotal point (a position where the accelerator arm 16 is supported) of the accelerator arm 16. This advantageously causes a principle of leverage of the magnetic coupling means 30 to act as described with reference to the operation of the device of the invention. Also, in the illustrated embodiment, as shown in FIGS. 1 and 2, the accelerator interlocking member 26 may comprise an attraction plate 32 of magnetic material such as iron or the like mounted by welding or the like on an end (a free end) 16a of the upper half portion 16A of the accelerator arm 16 at the back face thereof (a lefthand face of FIG. 1) so as to extend while crossing the accelerator arm 16. The throttle interlocking member 28 may comprise a cable holder 34 of channel steel at a lower horizontal portion 35 thereof pivotally supported by the support shaft 24 and having a length corresponding to that of the upper half portion 16A of the accelerator arm 16. A magnet mount plate 36 is secured by welding or the like to a pair of flange walls 34a and 34b and disposed therebetween so as to face the attraction plate 32 and two permanent magnets 38 are secured to the magnet mount plate 36. The permanent magnets 38 have a magnetic cover 40 of iron adapted to cover the faces of the permanent magnets 38 excluding the face corresponding to the attraction plate 32. The two permanent magnets 38 may be disposed symmetrically on both sides of the accelerator arm 16 relative thereto, respectively. In FIG. 1, reference numeral 42 designates an engaging member secured by welding or the like to the cable holder 34 on its upper face to engage a stop member secured to the vehicle body 20 when the accelerator pedal 14 is moved for more than a predetermined distance as described later. The engaging member 42 serves to prevent the throttle interlocking member 28 from being moved beyond the stop member.

Figure 6:
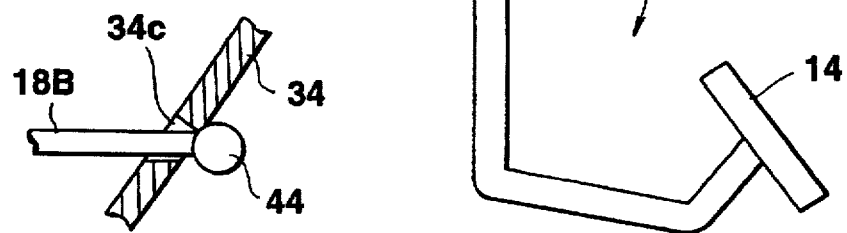
FIG. 6 is an enlarged sectional view of an extending hole in a cable holder through which a throttle cable extends.

As shown in FIG. 1, the cable body 18B of the throttle cable 18 extends through an extending hole 20a in the wall 20A of the vehicle body 20 and an extending hole 34c in the cable holder 34. A spherical body holder 44 is securely connected to the front end (the righthand end of FIG. 1) of the cable body 18B and engaged with the cable holder 34 so that the cable body 18B is not drawn out of the cable holder 34. As shown in FIG. 6, the extending hole 34c is so tapered that the inner diameter of the extending hole 34c is gradually larger and larger toward the inside of the vehicle body (in the leftward direction as viewed in FIG. 1) so that the front end of the cable body 18B is never bent when the magnetic coupling means 30 is pivotally moved about the support shaft 24.

Figure 3:
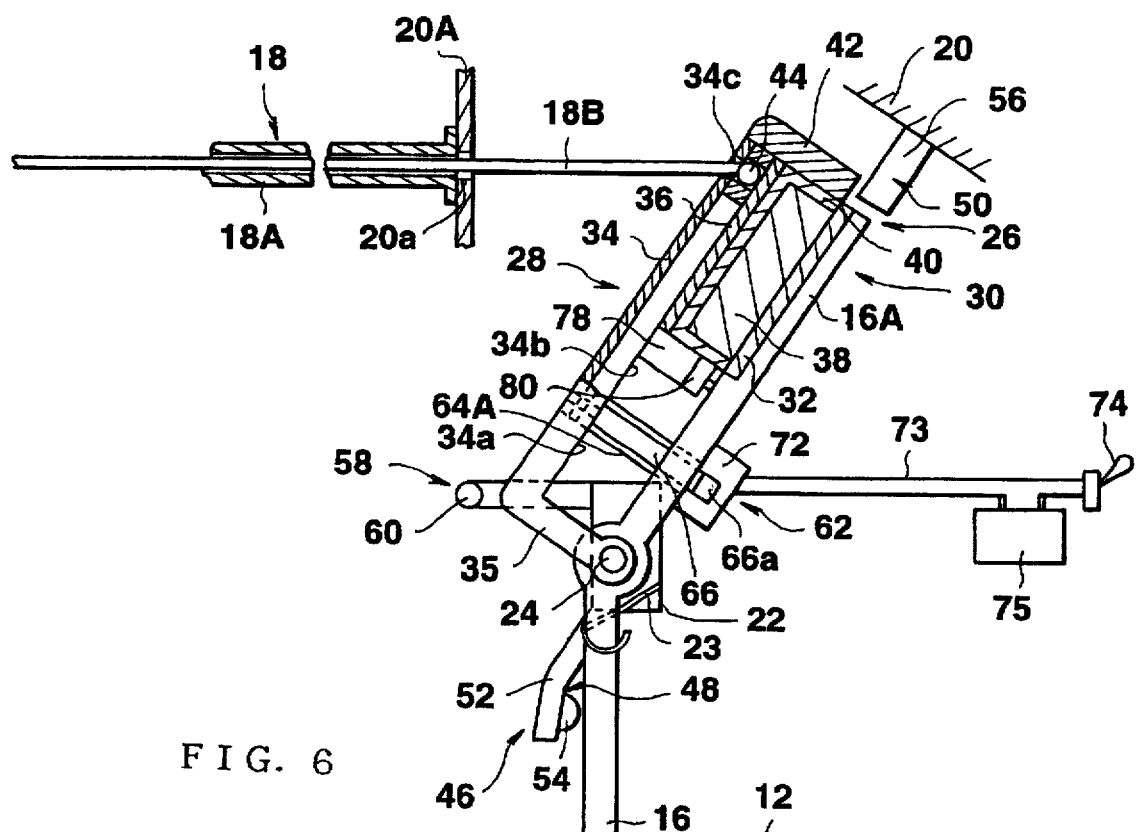

The attraction plate 32 of the accelerator interlocking member 26 of the magnetic coupling means 30 is normally magnetically attracted by the permanent magnets 38 of the throttle interlocking member 28 as shown in FIG. 1 to integrally couple the accelerator interlocking member 26 with the throttle interlocking member 28. Thus, as the accelerator pedal 14 is pushed down or pedalled as shown in FIG. 3, the accelerator interlocking member 26 and the throttle interlocking member 28 of the magnetic coupling means 30 are pivotally moved through the accelerator arm 16 about the support shaft 24 in a clockwise direction as viewed in FIG. 3. Therefore, the cable body 18B of the throttle cable 18 connected to the throttle interlocking member 28 is pulled so that the throttle valve is opened in accordance with the degree of pushing down the accelerator pedal 14.

Figure 5:
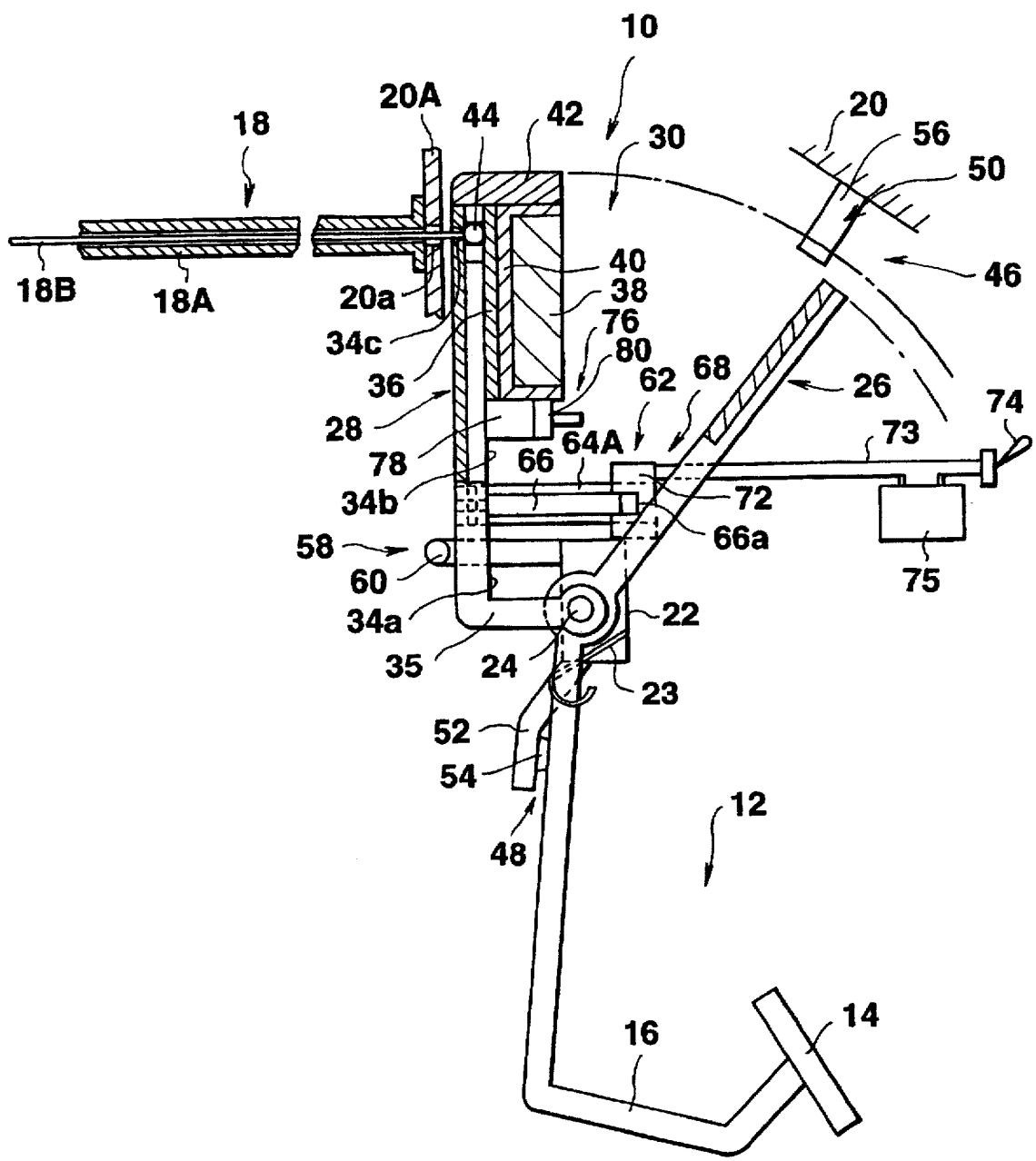
FIG. 5 is a side elevational view of the accelerator system having the device of FIG. 1, an accelerator interlocking member of which is moved in association with an accelerator pedal while a throttle interlocking member is left at the original position by abruptly and erroneously pushing down the accelerator pedal in place of a brake pedal, with a portion taken in section as in FIG. 1.

The magnetic coupling means 30 is so magnetically set that the accelerator interlocking member 26 is released from the throttle interlocking member 28 as soon as a pedalling force equal to or more than a pedalling force applied to a brake pedal is abruptly applied to the accelerator pedal 14. This causes the accelerator arm 16 and the accelerator interlocking member 26 to be pivotally moved while the throttle interlocking member 28 is left at the original position adjacent to the wall 20A of the vehicle body 20 (corresponding to the position of the throttle interlocking member 28 when the accelerator pedal 14 is not pushed down) as shown in FIG. 5 in accordance with an urging force applied to the throttle cable 18 in a leftward direction as viewed in FIG. 1, a mass of the whole throttle interlocking member 28, a leverage of the accelerator arm 16 and a set magnetic force of the permanent magnets 38 before the accelerator interlocking member 26 and the throttle interlocking member 28 coupled with each other by magnetic attraction of the permanent magnets 38 are moved together with each other by the accelerator arm 16. Particularly, since the leverage of the accelerator arm 16 causes the attraction plate 32 to be moved so that it is separated from the permanent magnets 38 sequentially from the upper portion thereof, the accelerator arm 16 having the attraction plate 32 held thereon is easily moved while the permanent magnets 38 are left so as to release the magnetic coupling when the accelerator arm 16 is abruptly pivotally moved in the same manner as the brake pedal is pushed down, but not is slowly pivotally moved in the same manner as in the normal operation of the accelerator.

The device 10 of the invention further comprises stop means 46 to stop the movement of the throttle interlocking member 28 at the accelerator pedalling position where the accelerator interlocking member 26 exceeds the furthermost pedalling position of the normal accelerating operation so that only the accelerator interlocking member 26 further moves to release the accelerator interlocking member 26 from being magnetically coupled with the throttle interlocking member 28.

In the illustrated embodiment, this stop means 46 may comprise a first stop member 48 to stop further pushing down of the accelerator pedal in the normal accelerating operation so as to set the furthermost pedalling distance and a second stop member 50 to be engaged against the engaging member 42 of the throttle interlocking member 28 so that the throttle interlocking member 28 is released from being magnetically coupled with the accelerator interlocking member 26 because the throttle interlocking member 28 never further moves in the accelerating direction while the first stop member 48 is deformed when the accelerator pedal 14 is pushed down beyond the furthermost pedalling distance of the normal accelerating operation.

Figure 31:
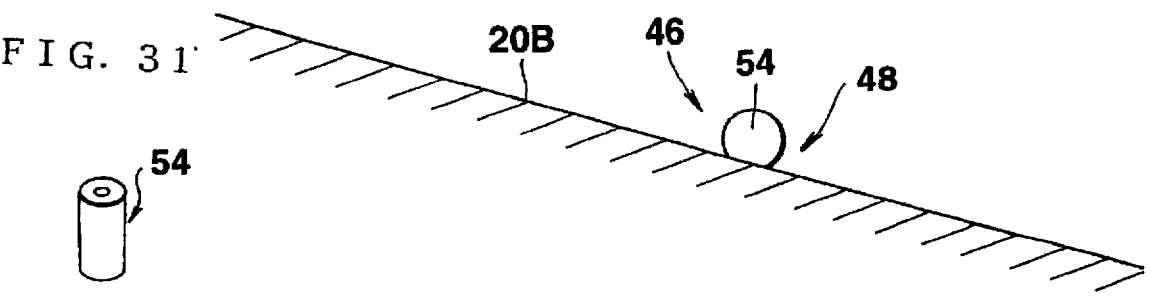
FIG. 31 is a perspective view of a modification of the first stop member used for the invention.

In the illustrated embodiment, as shown in FIGS. 1 and 2, the first stop member 48 may comprise a stationary extending piece 52 downwardly extending from the base 22 so as to face the accelerator arm 16 and a stop body 54 secured to the stationary extending piece 52. The stop body 54 may be formed of resilient material such as hard rubber or the like being deformed by pushing down the accelerator pedal 14 beyond the furthermost pedalling distance of the normal accelerating operation. Also, it may be formed of a cylindrical body of plastically deformable material such as hard glass or the like as shown in FIG. 31, for instance which is plastically deformed to allow the accelerator arm 16 to be moved by pushing down the accelerator pedal 14 beyond the furthermost pedalling distance of the normal accelerating operation. The cylindrical body may be so disposed as that the front face of the accelerator arm 16 is engaged against the peripheral face of the cylindrical body, but may be preferably so disposed that the accelerator arm 16 is engaged against the longitudinal end face of the cylindrical body. Of course, the stop body 54 of plastically deformable material is not limited to one of cylindrical form.

As shown in FIG. 1, the second stop member 50 may comprise a stop body 56 secured to the vehicle body 20 by any suitable means. The stop body 56 is set at a position where the engaging member 42 of the throttle interlocking member 28 never engages the stop body 56 at the pedalling distance of the normal accelerating operation (see FIG. 3). However, the engaging member 42 of the throttle interlocking member 28 engages the stop body 56 as the accelerator arm 16 is moved beyond the furthermost pedalling distance of the normal accelerating operation while the first stop member 48 is deformed (see FIG. 4).

In the illustrated embodiment, the first stop member 48 may be so disposed as to face the lower half portion of the accelerator arm 16 on the rear face thereof (the lefthand face of FIG. 1), but may be so disposed as to face the upper half portion 16A of the accelerator arm 16 on the front face thereof (the righthand face of FIG. 1). The second stop member 50 may be disposed at the area of an arc motion about the support shaft 24 of the engaging member 42 mounted on the top of the throttle interlocking member 28, but may be disposed so as to engage the engaging member which is not mounted directly on the throttle interlocking member 28, but on the portion of the cable body 18B exposed out of the outer case 18A so that the cable body 18B of the throttle cable 18 stops at the predetermined position.

As shown in FIGS. 1 and 2, there may be provided position control means 58 to control the position of the throttle interlocking member 28 so as not to further move beyond the position of FIG. 1 in the leftward direction thereof. The position control means 58 may comprise a stop member 60 in the form of rod extending from the base 22 in the rearward direction and then bent so as to engage the rear face of the cable holder 34 of the throttle interlocking member 28.

The accelerator erroneous operation preventing device 10 of the invention may further comprise lock means 62 to lock the accelerator interlocking member 26 with the throttle interlocking member 28 so that they are never released from the magnetic coupling condition when the function of preventing the accelerator from being erroneously operated is not required.

Figure 7:
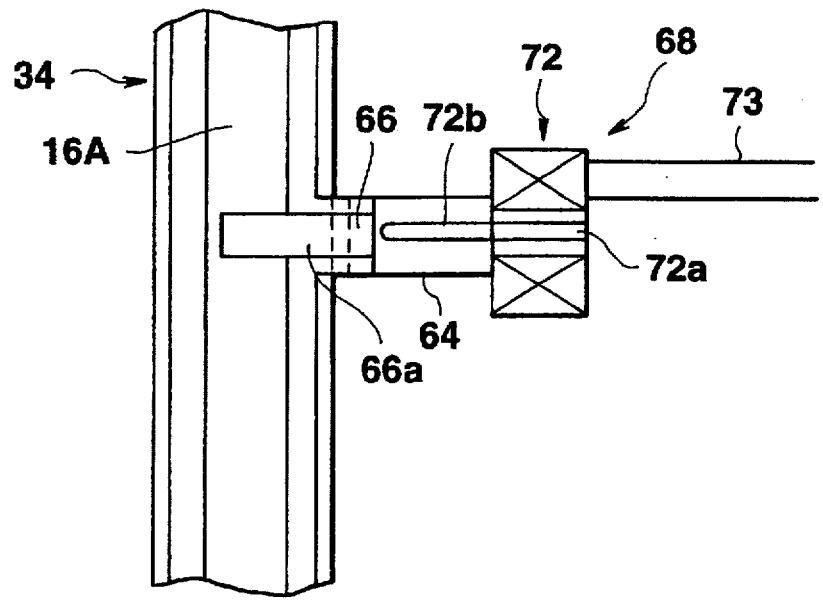
FIG. 7 is an enlarged front view of lock means used for the device of FIGS. 1 through 5, as viewed from the right side of FIG. 1.
Figure 8A:
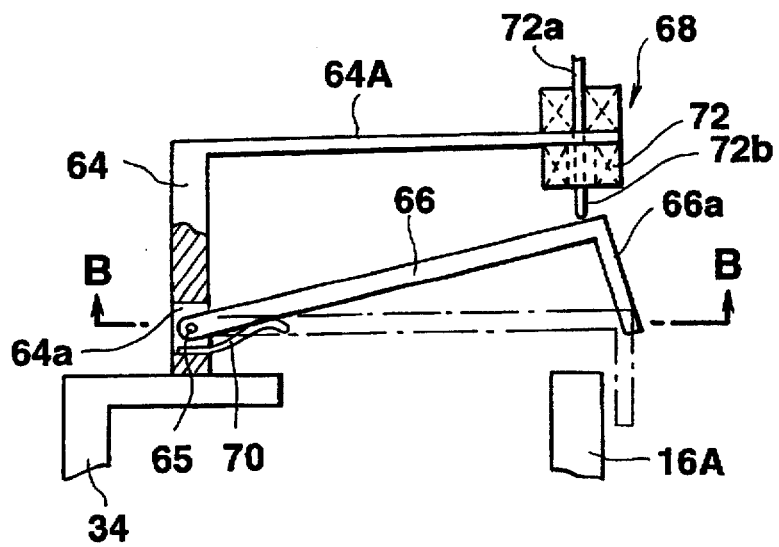
FIG. 8A is a top view of the lock means of FIG. 7, as rotated 90° counterclockwise and with a portion taken in horizontal section.
Figure 8B:
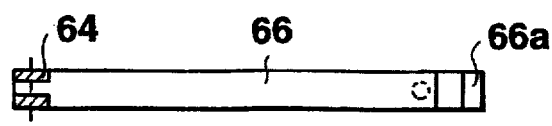
FIG. 8B is a side elevational view of a locking arm taken along a line B—B of FIG. 8A.

An example of the lock means 62 is shown in FIGS. 7, 8A and 8B. The lock means 62 may comprise a lock arm 66 pivotally supported on a bracket 64 mounted on the side of the cable holder 34 at a supporting hole 64a thereof as shown in FIG. 8A and an actuator 68 to drive the lock arm 66 between a locking position and a lock releasing position. The lock arm 66 is mounted on the inner wall face of the support hole 64a in the bracket 64 and held by a spring 70 engaging the inner face of the lock arm 66 so as to release the lock means from the locking position (see FIG. 8A). The actuator 68 may comprise a pushing type linear solenoid 72 mounted on an extension 64A extending from the bracket 64 as shown in FIG. 8A with a pushing rod 72b integrally provided on an armature 72a engaging a free end of the lock arm 66.

Thus, the lock arm 66 is normally positioned so as to be released from the locking condition by the spring 70, and therefore the accelerator erroneous operation preventing device 10 can prevent the accelerator from being erroneously operated as described in detail later. However, when the linear solenoid 72 is energized, the armature 72a is magnetically attracted in the downward direction as viewed in FIG. 8A so that the pushing rod 72b pushes the lock arm 66 against the spring 70 with a leading hook portion 66a of the lock arm 66 hooked on the accelerator arm 16 as indicated by a dotted line of FIG. 8A. Thus, the accelerator interlocking member 26 and the throttle interlocking member 28 of the magnetic coupling means 30 are never released from the magnetic coupling condition so that the accelerator arm 16 is effectively integral with the throttle cable 18. In FIG. 1, reference numeral 74 designates a switch provided on a driver panel and connected through a lead wire 73 between a battery 75 and the linear solenoid 72 so that the linear solenoid 72 is energized or disenergized.

The accelerator erroneous operation preventing device 10 of the invention may further comprise erroneous operation warning means 76 to warn to a driver that the accelerator is erroneously operated. As shown in FIG. 1, this erroneous operation warning means 76 may comprise a switching element 80 held on a support 78 which is in turn secured by welding or the like to the flange walls 34a and 34b of the cable holder 34 so as to face the rear face of the upper half portion 16A of the accelerator arm 16 and a warning circuit 82 connected through a lead wire 81 to the switching element 80 and to be driven thereby. The warning circuit 82 is omitted in FIGS. 2 through 5.

The warning circuit 82 may preferably include a speech synthesis system 82B issuing a speech of "Please release the foot from the pedal" or the like, for example as well as a warning device 82A such as a buzzer or the like. There may be provided a lead wire elastic portion 81A at a portion of the lead wire 81 to allow the lead wire 81 to be expanded and contracted when the throttle interlocking member 28 together with the switching element 80 is pivotally moved about the support shaft 24.

An operation of the device of the invention will be described with reference to FIGS. 1 through 5, the lock means 62 is normally positioned to be released from the lock condition as aforementioned. Also, the accelerator interlocking member 26 and the throttle interlocking member 28 are normally integral to each other by magnetically coupling the permanent magnet 38 with the attraction plate 32.

Accordingly, when the accelerator pedal 14 is pushed down with the normal operation of the accelerator, the accelerator arm 16 serves to pull the throttle cable 18 from the condition of FIG. 1 to the condition of FIG. 3 in case of the accelerator pedal is furthermost pushed down to open the throttle valve to increase the revolution speed of the engine and the running speed of the vehicle. Even when the accelerator pedal 14 is pushed down for the furthermost pedalling distance, the accelerator arm 16 engages the first stop member 48 of the stop means 46 and therefore the accelerator arm 16 is not moved further. Since the normal operation of the accelerator is by relatively slowly pushing down or releasing the accelerator pedal 14, the magnetic coupling condition of the magnetic coupling means 30 is never released. Also, since abrupt acceleration on passing another vehicle will be made in the condition of pushing down the accelerator by some degree, the accelerator arm 16 is moved in the accelerating direction while the magnetic coupling condition of the magnetic coupling means 30 is maintained, but since the pedalling distance thereof never reaches the degree by which the accelerator arm 16 deforms the first stop member 48, the coupling condition of the attraction plate 32 and the permanent magnets 38 of the magnetic coupling means 30 is never released by the condition of pushing down the accelerator pedal.

In the motor vehicle having the automatic transmission mounted thereon, a driver sometimes operates while the accelerator pedal 14 is released from the foot. On such a condition, the accelerator pedal 14 is sometimes erroneously pushed down in spite of the brake pedal being intended to be pushed down. In this case, as a pedalling force equal to or more than the pedalling force to be applied to the brake pedal is applied to the accelerator pedal 14, the magnetic coupling means 30 is released from the coupling condition thereof because it is so magnetically set to immediately release the accelerator interlocking member 26 from the throttle interlocking member 28 by such abrupt operation of the accelerator pedal 14. More particularly, before the throttle interlocking member 28 is moved together with the accelerator interlocking member 26 through the accelerator arm 16 by pushing down the accelerator pedal 14, the accelerator arm 16 and the accelerator interlocking member 26 are pivotally moved in accordance with the pedalling distance of the accelerator pedal 14 while the throttle interlocking member 28 is left at the original position as shown in FIG. 5, which is caused by the urging force applied to the throttle cable 18, the mass of the whole throttle interlocking member 28, the leverage of the accelerator arm 16 and the set magnetic force of the permanent magnets 38. Since the leverage of the accelerator arm 16 causes the attraction plate 32 to be moved so that it is separated from the permanent magnets 38 sequentially from the upper portion thereof, when the accelerator arm 16 is pivotally moved not slowly as in the normal operation of the accelerator, but abruptly as in the erroneous operation of the accelerator in place of the brake, the accelerator arm 16 having the attraction plate 32 held thereon is more easily moved while the permanent magnets 38 are left to release the magnetic coupling condition of the magnetic coupling means 30.

Accordingly, in spite of the accelerator pedal 14 being pushed down, the throttle cable 18 is hardly pulled as shown in FIG. 5 and therefore the vehicle is never accelerated. This means that the accelerator can be prevented without any time delay from being erroneously operated because the accelerator pedal 14 is disconnected from the throttle cable 18 at the same time when the accelerator erroneous operation is detected.

Figure 4:
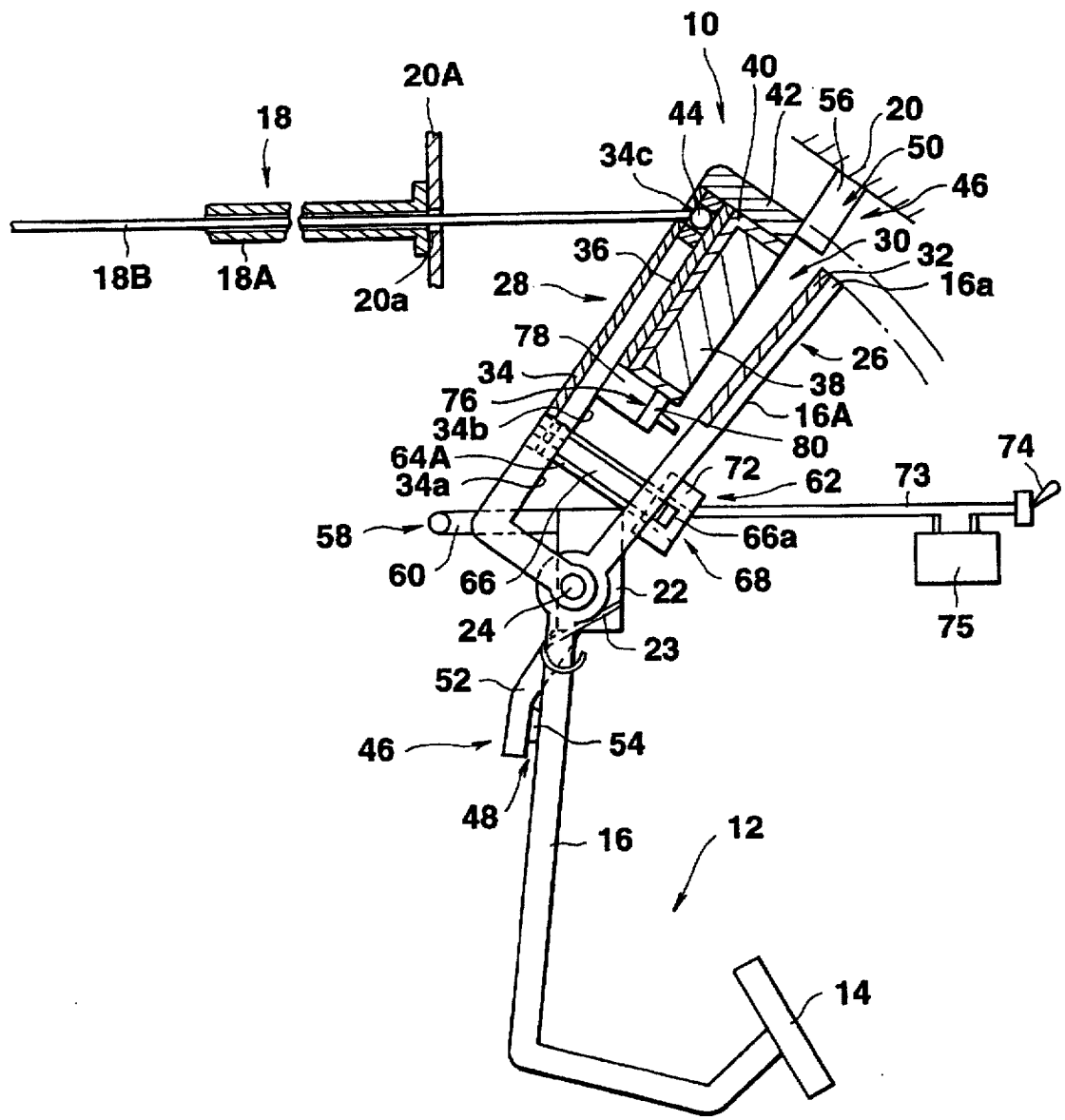
FIG. 4 is a side elevational view of the accelerator system having the device of FIG. 1 moved beyond the furthermost pedalling position of a normal operation of the accelerator to release the magnetic coupling means, with a portion taken in section as in FIG. 1.

Next, in case that the vehicle is driven while the accelerator is normally operated with the foot contacting the accelerator pedal 14, the accelerator pedal 14 is sometimes pushed down with the pedalling force equal to or more than the pedalling force applied to the brake pedal. In this case, the accelerator arm 16 provided on the side of the accelerator interlocking member 26 engages the first stop member 4, but as the accelerator pedal 14 is erroneously strongly pushed down in place of the brake pedal, the attraction plate 32 of the accelerator interlocking member 26 moves beyond the second stop member 50 while the resilient stop body 54 is deformed as shown in FIG. 4. On the other hand, since the engaging member 42 of the throttle interlocking member 26 engages the second stop member 50 so as not to move beyond the second stop member 50, the attraction plate 32 of the accelerator interlocking member 26 is released from being magnetically coupled with the permanent magnets 38 of the throttle interlocking member 28 so as to move beyond the second stop member 50 while the throttle interlocking member 28 is left at the second stop member 50. The throttle interlocking member 28 is immediately returned to the accelerator releasing position by the throttle cable 18 connected to the throttle valve and normally urged by the spring or the like to close the throttle valve, which causes the accelerator to be prevented from being erroneously operated.

In this manner, either in case that abruptly initiating to push down the accelerator pedal 14 causes the magnetic coupling means 30 to be released from the magnetic coupling condition to prevent the accelerator from being erroneously operated, or in case that abruptly pushing down the accelerator pedal 14 in place of the brake pedal during the normal pedalling operation of the accelerator causes the magnetic coupling means 30 to be released from the magnetic coupling condition by the stop means 46 to prevent the accelerator from being erroneously operated, since the switching element 80 of the erroneous operation warning means 76 is closed by moving far away from the accelerator arm 16, the warning circuit 82 is energized so that the buzzer is driven or the speech of "Please release the foot from the pedal" or the like is issued. Thus, the driver can recognize the erroneous operation of the accelerator. Therefore, the driver can switch from the accelerator pedal to the brake pedal immediately to decelerate or stop the vehicle.

As the driver recognizes the erroneous operation of the accelerator and releases his foot from the accelerator pedal 14, the accelerator arm 16 is moved by the coil spring 23 so as to again couple the accelerator interlocking member 26 of the magnetic coupling means 30 with the throttle interlocking member 28 thereof. In this manner, since only releasing the foot from the accelerator pedal 14 causes the magnetic coupling means 30 to be returned to the original condition, the accelerator can be again normally operated.

In case that there is required no erroneous operation of the accelerator, the switch 74 of the lock means 62 is closed to energize the linear solenoid 72 so as to magnetically attract the armature 72a. This causes the pushing rod 72b integral to the armature 72a to push the lock arm 66 against the spring 70 from the solid line position of FIG. 8A to the dotted line position thereof, which causes the end hook portion 66a of the lock arm 66 to hook the accelerator arm 16 so that the accelerator interlocking member 26 and the throttle interlocking member 28 are integrally locked with each other. This integrally connects the accelartor arm 16 to the throttle cable 18 so that the vehicle is driven with the normal operation of the accelerator.

The accelerator erroneous operation preventing device 10 of the invention can be manufactured and sold as a unit assembly together with the accelerator pedal 14 and therefore the device of the invention can be easily assembled in the existing vehicles. Since the existing vehicles have the throttle cable 18 connected directly to the accelerator arm 16, the throttle cable is disconnected from the accelerator arm 16, the accelerator pedal and the accelerator arm mounted on the existing vehicle are replaced by the assembly of the device of the invention and the throttle cable 18 is connected to the throttle interlocking member 28 of the device of the invention.

The accelerator erroneous operation preventing device 10 constructed in accordance with another embodiment (a second embodiment) of the invention is shown in FIGS. 9 through 14. In these figures, the same reference numerals as those in FIGS. 1 through 8 designate the same components.

The device of the second embodiment is substantially identical to that of the first embodiment, except that the magnetic coupling means 30 is disposed within a cylindrical casing 84 which is in turn mounted on the vehicle body (not shown) and there is provided guide means to linearly guide the accelerator interlocking member 26 and the throttle interlocking member 28 of the magnetic coupling means 30 within the casing 84. Also, the attraction plate 32 of the accelerator interlocking member 26 is not mounted directly on the accelerator arm 16, but connected to a free end 16a of the accelerator arm 16 through a connecting rod 88.

Figures 9, 10:
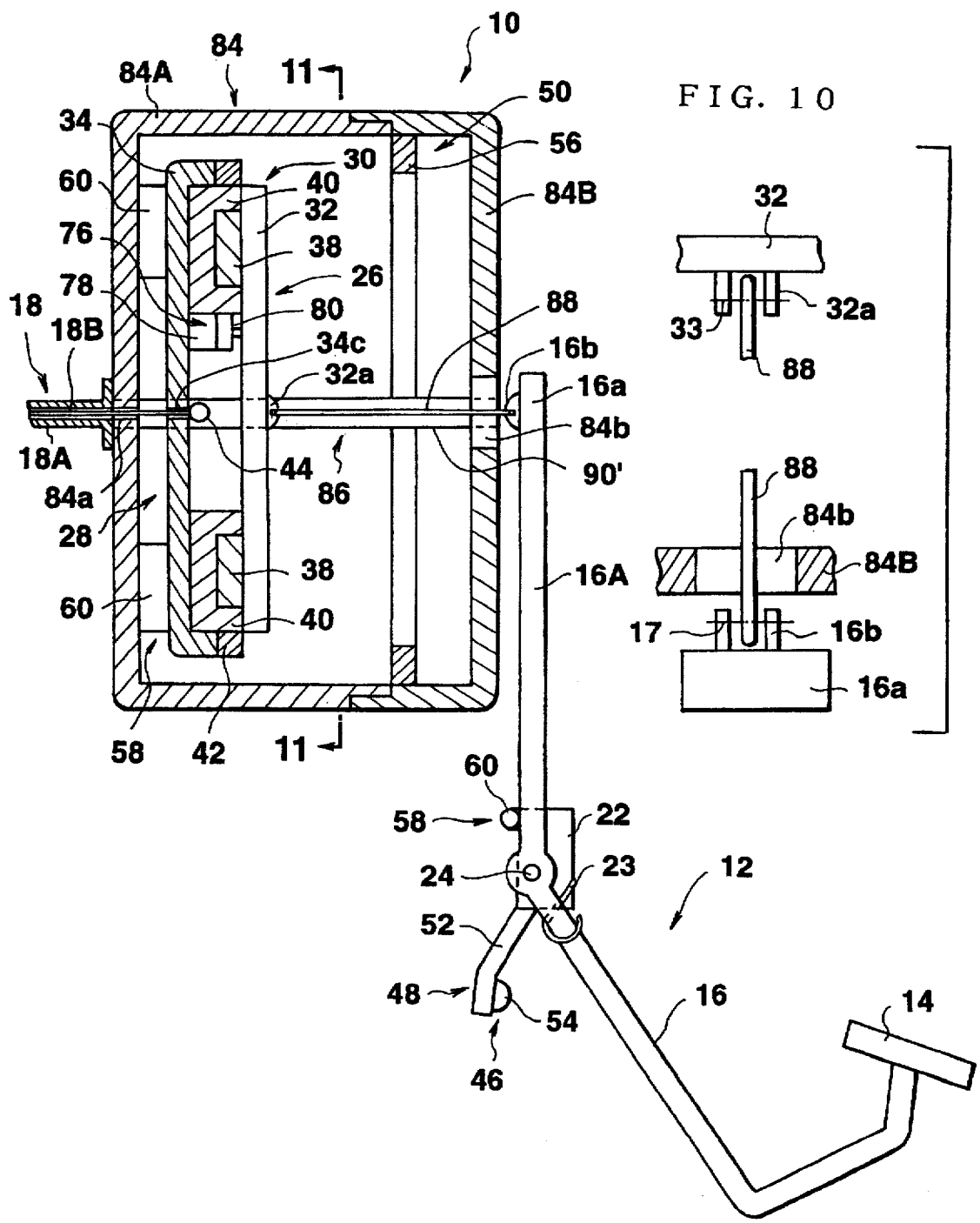
FIG. 9 is a side elevational view of an accelerator system having a device for preventing an accelerator from being erroneously operated in accordance with a second embodiment of the invention, with a portion thereof taken in section.
FIG. 10 is an enlarged side elevational view of a portion of the device of FIG. 9 having a connecting rod to connect an accelerator arm and an accelerator interlocking member to each other and relative components thereof.
Figure 11:
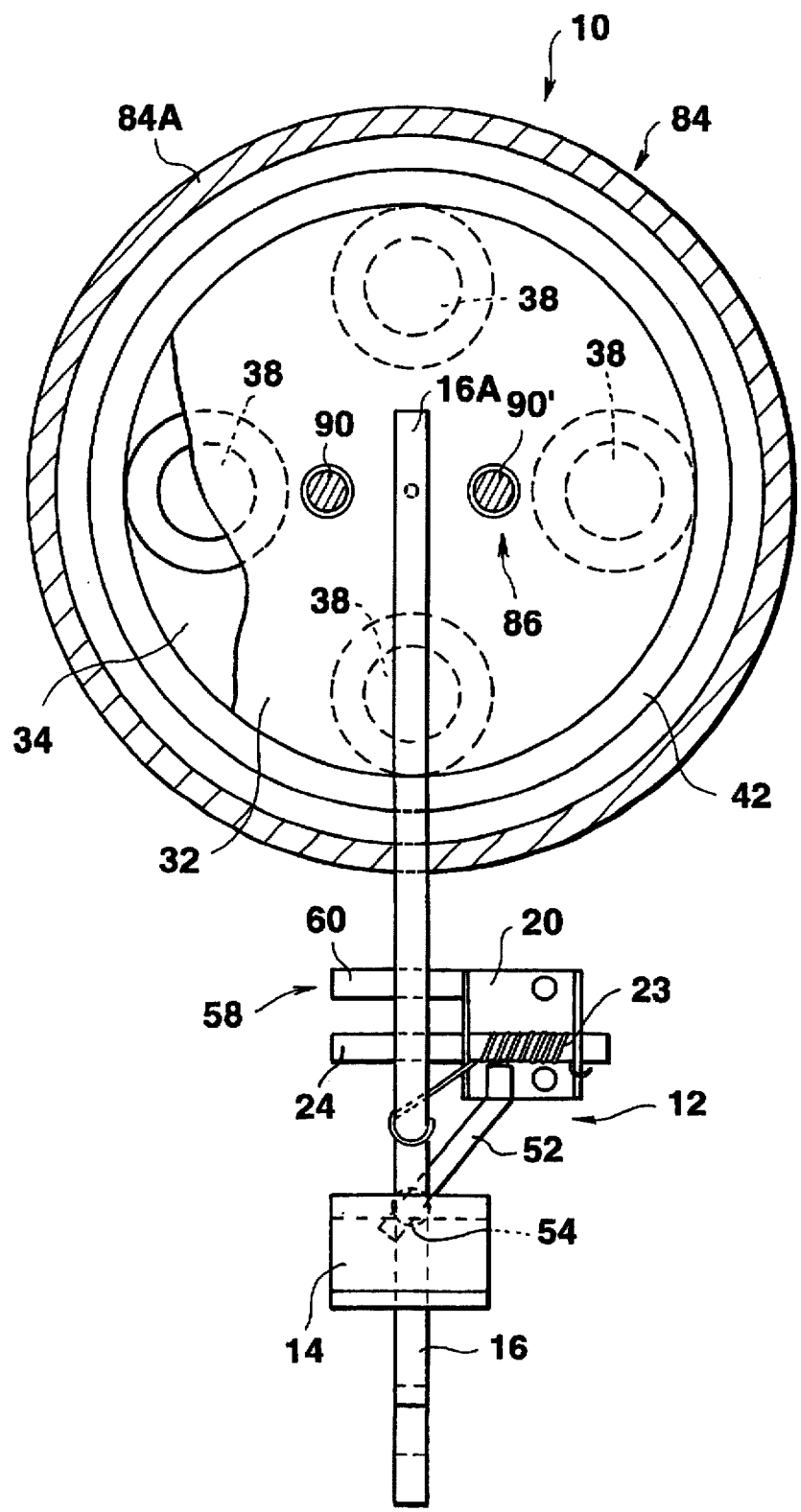
FIG. 11 is a front view of an interior of a casing used for the device of FIG. 9 taken along a line 11—11 of FIG. 9.

As shown in FIG. 9, the casing 84 may comprise crown-like casing halves 84A and 84B, which are joined with each other in the form of a socket or faucet. The casing 84 may be formed by containing the magnetic coupling means 30 within the casing 84 and then joining the casing halves 84A and 84B by any suitable means.

Figure 12:
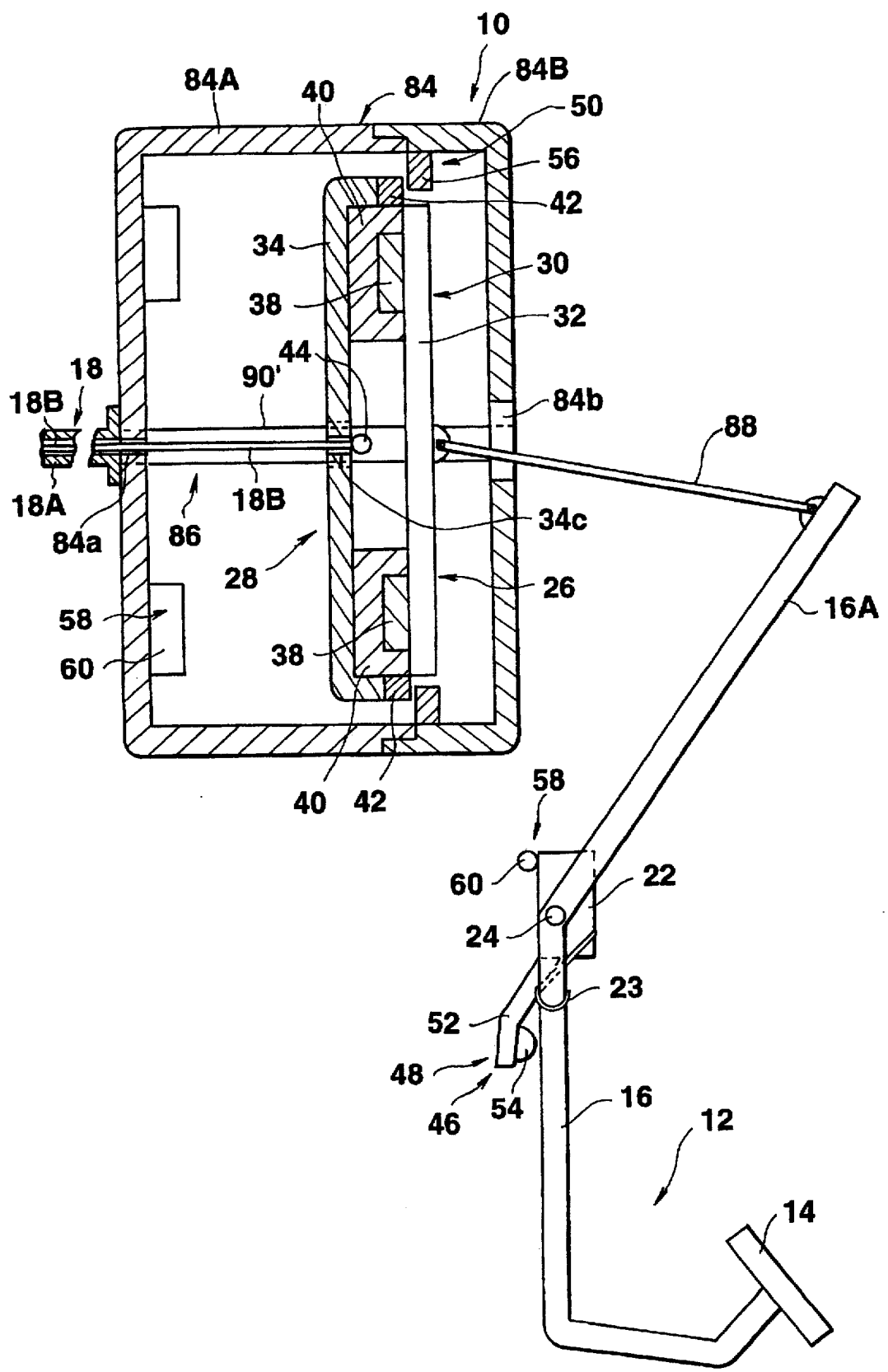
FIG. 12 is a side elevational view of the accelerator system having the device of FIG. 9 moved to the furthermost pedalling position of a normal operation of the accelerator, with a portion taken in section as in FIG. 9.
Figure 13:
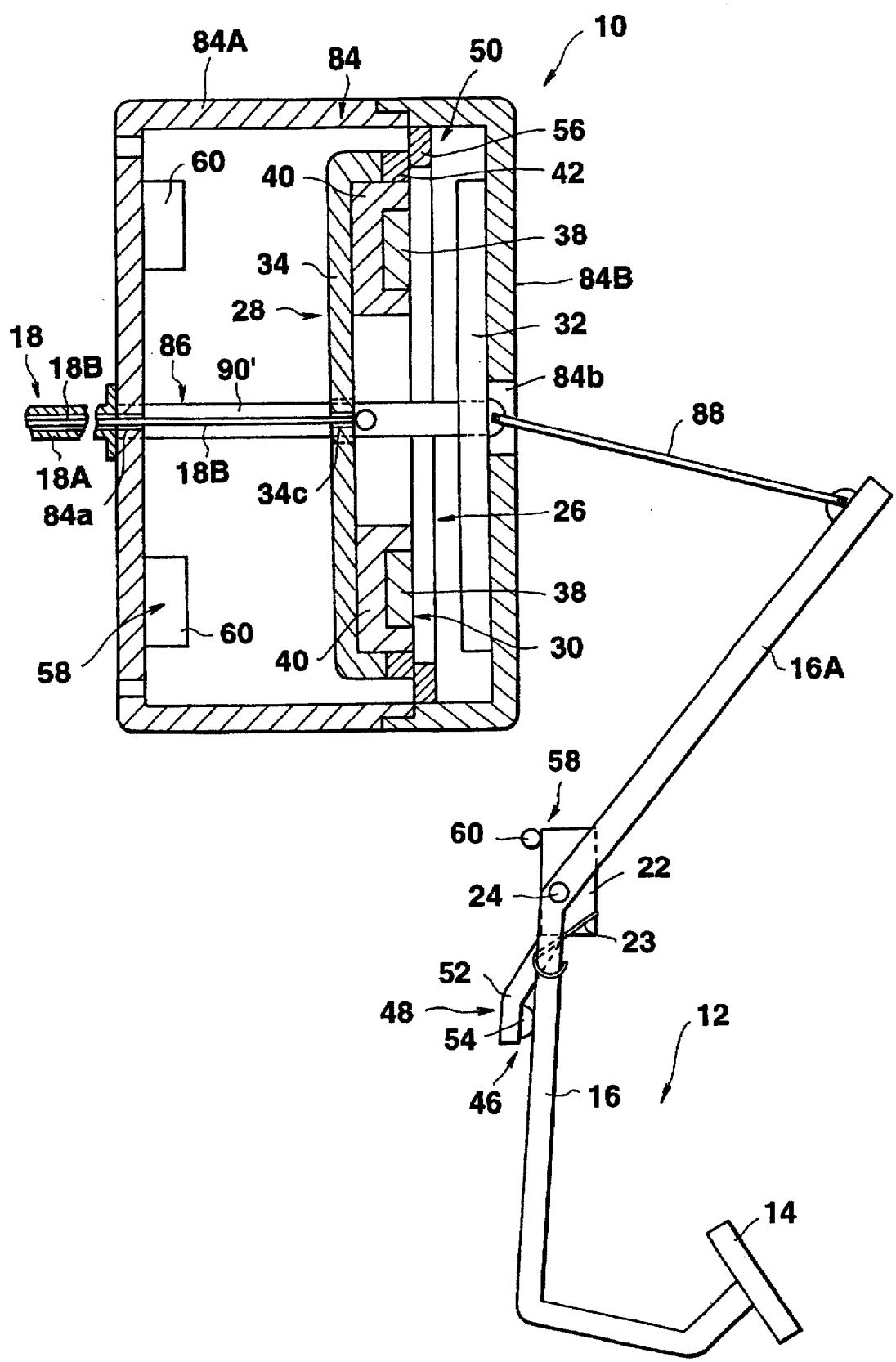
FIG. 13 is a side elevational view of the accelerator system having the device of FIG. 9 erroneously moved beyond the furthermost pedalling position of a normal operation of the accelerator in spite of a brake pedal being pushed down to release the magnetic coupling means, with a portion taken in section as in FIG. 9.

As shown in FIGS. 9 and 10, the connecting rod 88 may extend through an extending hole 84b in the casing half 84B of the casing 84 with one end (rear end) thereof pivotally supported by a pin 33 on a fork-like bracket 32a of the attraction plate 32 and with the other end (front end) thereof pivotally supported by a pin 17 on a fork-like bracket 16b provided on the inner face of the accelerator arm 16 at the free end 16a thereof. As shown in FIGS. 12 and 13, the extending hole 84b in the casing half 84B has the inner diameter enough for the connecting rod 88 to be allowed to be pulled while inclined as the accelerator arm 16 is pivotally moved and for the bracket 32a to enter the extending hole 84b.

In the illustrated embodiment, the throttle interlocking member 28 may comprise four permanent magnets 38 mounted on the crown-like cable holder 34 in a manner equally spaced in a peripheral direction (see FIG. 11), and may be covered with the magnetic covers 40 except for the portion facing the attraction plate 32 in the same manner as in the first embodiment. Since the permanent magnets 38 can be mounted directly on the cable holder 34, the magnet mounting plate 36 for the first embodiment is omitted. The throttle cable 18 extends through the extending hole 84a in the casing 84 and through the extending hole 34c in the cable holder 34 and connected to the throttle interlocking member 28 as that the throttle cable 18 is prevented from being removed out of the throttle interlocking member 28 by the cable holder 44. The engaging member 42 of the throttle interlocking member 28 may be in the form of ring mounted on the crown-like cable holder 34 at the inner peripheral end there of while the stop body 56 of the second stop member 50 which the engaging member 42 engages is in the form of a ring mounted on the half 84B of the casing 84 at the inner periphery thereof. Since the magnetic coupling means 30 linearly moves through the guide means 86, the extending hole 34c may be not tapered as in the first embodiment, but linearly formed.

The guide means 86 may comprise a pair of guide rods 90 and 90' provided within the casing 84 on both sides of and parallel to the center axis thereof and in parallel to the center axis and extending through the attraction plate 32 and the cable holder 34 so that they are slidably guided. Thus, the accelerator interlocking member 26 and the throttle interlocking member 28 of the magnetic coupling means 30 are linearly guided along the guide rods 90 and 90'.

As shown in FIGS. 9, and 12 through 14, the position control means 58 may comprise a plural of stop members 60 mounted on the portion of the half 84A of the casing 84 facing to the cable holder 34. The stop members 60 may be formed of hard rubber, for example.

Since the operation of the accelerator erroneous operation of the accelerator 10 in accordance with the second embodiment is substantially identical to that of the first embodiment, the detailed description thereof will be omitted. However, in the second embodiment, the magnetic coupling means 30 is independent from the pivotal movement of the accelerator arm 16 and linearly guided by the guide means 86, which is different from the movement of the magnetic coupling means 30 of the first embodiment. Thus, since the leverage of the accelerator arm 16 is not acted to the attraction plate 32 which is magnetically attracted onto the permanent magnets 38, all the permanent magnets 38 are simultaneously removed away from the attraction plate 32. Thus, the attracting force of the permanent magnets 38 which is required to initially release the magnetic coupling condition and more particularly to remove the attraction plate 32 far away from the permanent magnets 38 by pushing down the accelerator pedal 14 in place of the brake pedal while the vehicle is driven with the foot being released from the accelerator pedal 14 can be lower than that of the first embodiment. In the illustrated embodiment, since the position where the connecting rod 88 is connected to the accelerator interlocking member 26 and the position where the throttle cable 18 is connected to the throttle interlocking member 28 are located on the center axes of the interlocking members, the leverage of the accelerator arm cannot be used. But, it will be apparent to the those skilled in the art that the positions of connection may be displaced from the center axes so that the leverage can be applied to the magnetic coupling means 30.

Figure 14:
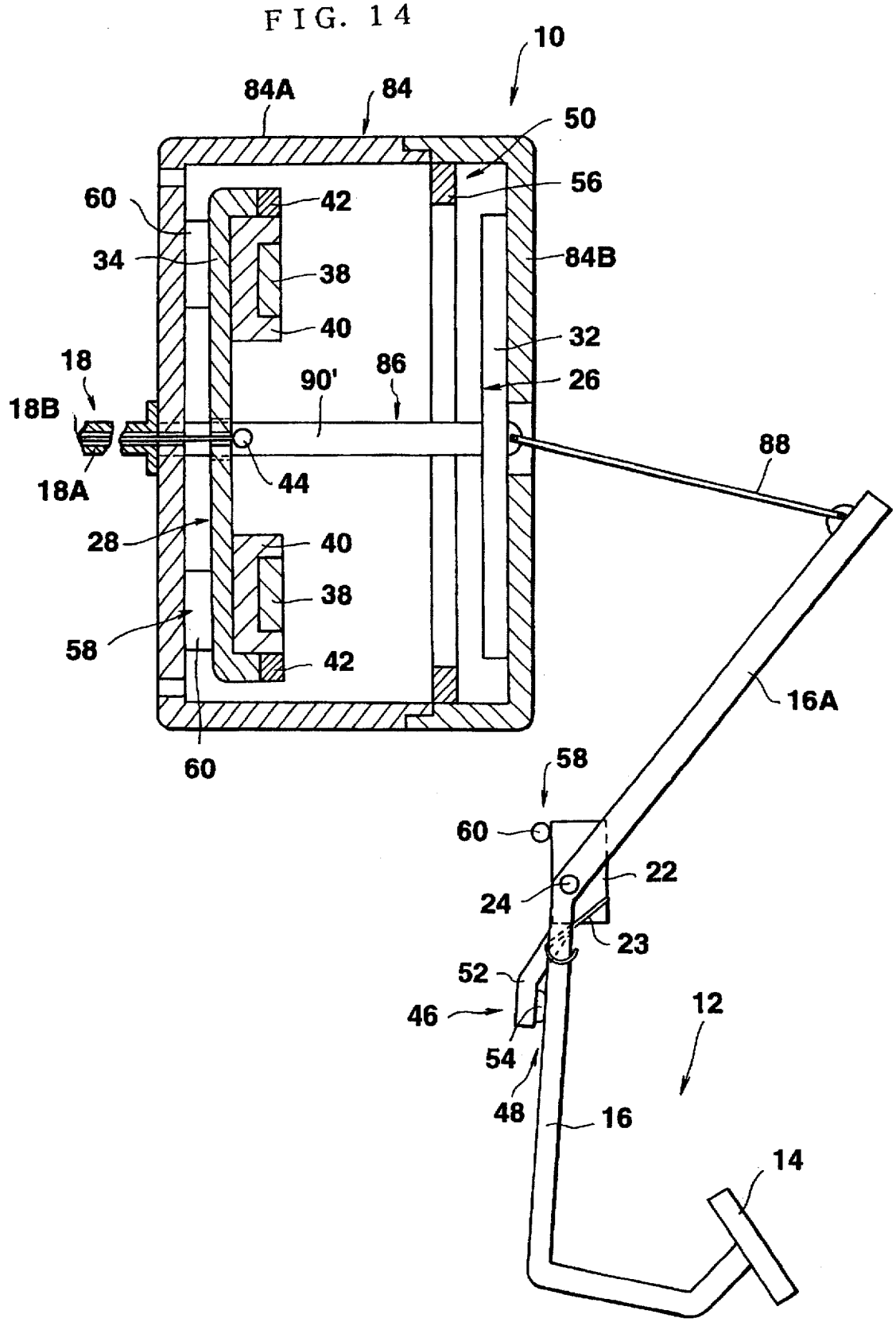
FIG. 14 is a side elevational view of the accelerator system having the device of FIG. 9, an accelerator interlocking member of which is moved in association with an accelerator pedal while a throttle interlocking member is left at the original position by abruptly and erroneously pushing down the accelerator pedal in place of the brake pedal, with a portion taken in section as in FIG. 9.

In the second embodiment, FIG. 12 corresponds to FIG. 3 of the first embodiment and illustrates the accelerator pedal to be pushed down to the furthermost pedalling distance while the accelerator is normally operated. FIG. 13 corresponds to FIG. 4 of the first embodiment and illustrates the accelerator pedal 14 to be erroneously in place of the brake pedal from the condition of the accelerator pedal 14 being pushed down, but the accelerator to be prevented from being erroneously operated. FIG. 14 corresponds to FIG. 5 of the first embodiment and illustrates the accelerator pedal 14 to be erroneously in place of the brake pedal from the condition of the foot being released from the accelerator pedal 14, but the accelerator to be prevented from being erroneously operated.

As in the first embodiment, there may be provided the erroneous operation warning means 76, only the switching element 80 of which is shown in FIG. 9. The switching element 80 may be connected to the warning circuit 82 which may be identical to that of the first embodiment. The erroneous operation warning means 76 is shown to be omitted in FIGS. 11 through 14. Although also omitted in FIGS. 9 through 14, there may be provided lock means to lock the coupling condition of the magnetic coupling means 30. The casing 84 may be provided with escaping holes through which parts such as the lock arm for the lock means enter the casing 84 while they are never interfered with the casing 84.

The accelerator erroneous operation preventing device 10 constructed in accordance with a further embodiment (a third embodiment) of the invention is shown in FIGS. 15 through 19. In these figures, the same reference numerals as those of FIGS. 1 through 14 designate the same components.

The device of the third embodiment is substantially identical to that of the second embodiment, except that there is provided no cylindrical casing 84 containing the magnetic coupling means 30 and also no guide means to guide the accelerator interlocking member 26 and the throttle interlocking member 28 of the magnetic coupling means 30 and that the attraction plate 32 of the accelerator interlocking member 26 is mounted directly on the accelerator arm 16.

Accordingly, in the third embodiment, when the accelerator pedal 14 is pushed down on the normal operation of the accelerator, the magnetic coupling means 30 is pivotally moved together with the accelerator arm 16 about the support shaft 24, in the same manner as in the first embodiment. The stop member 56 is mounted in the area of the vehicle body 20 where the cable holder 34 of the throttle interlocking member 28 is pivotally moved and at the position where the engaging member 42 on the throttle interlocking member 28 engages the stop member 56 when the accelerator arm 16 further moves until the first stop member 48 is deformed after the accelerator arm 16 engages the first stop member 48. Furthermore, in the same manner as in the first embodiment, the extending hole 34c is so tapered that the throttle cable 18 is prevented from being bent at the portion where it extends through the cable holder 34.

Since the operation of the accelerator erroneous operation preventing device 10 in accordance with the third embodiment is substantially identical to those of the first and second embodiments, the detailed description thereof will be omitted. However, in the third embodiment, the magnetic coupling means 30 is pivotally moved in the same manner as in the first embodiment, which is different from that of the second embodiment. Thus, since the leverage of the accelerator arm 16 is applied to the attraction plate 32 which is magnetically attracted onto the permanent magnets 38, the attraction plate 32 is pivotally moved while it is separated sequentially from the upperside permanent magnet 38 toward the lowerside permanent magnets 38 when the accelerator pedal 14 is abruptly pushed down in place of the brake pedal from the condition of driving the vehicle with the foot being releasing from the accelerator pedal 14 with the pedalling force equal to or more than the pedalling force applied to the brake pedal. Therefore, only the accelerator interlocking member 26 can be pivotally moved in association with the accelerator pedal 14 without accompanying the throttle interlocking member 28 while it is left at the original position so that the magnetic coupling condition of the magnetic coupling means 30 is released (see FIG. 19).

Figure 17:
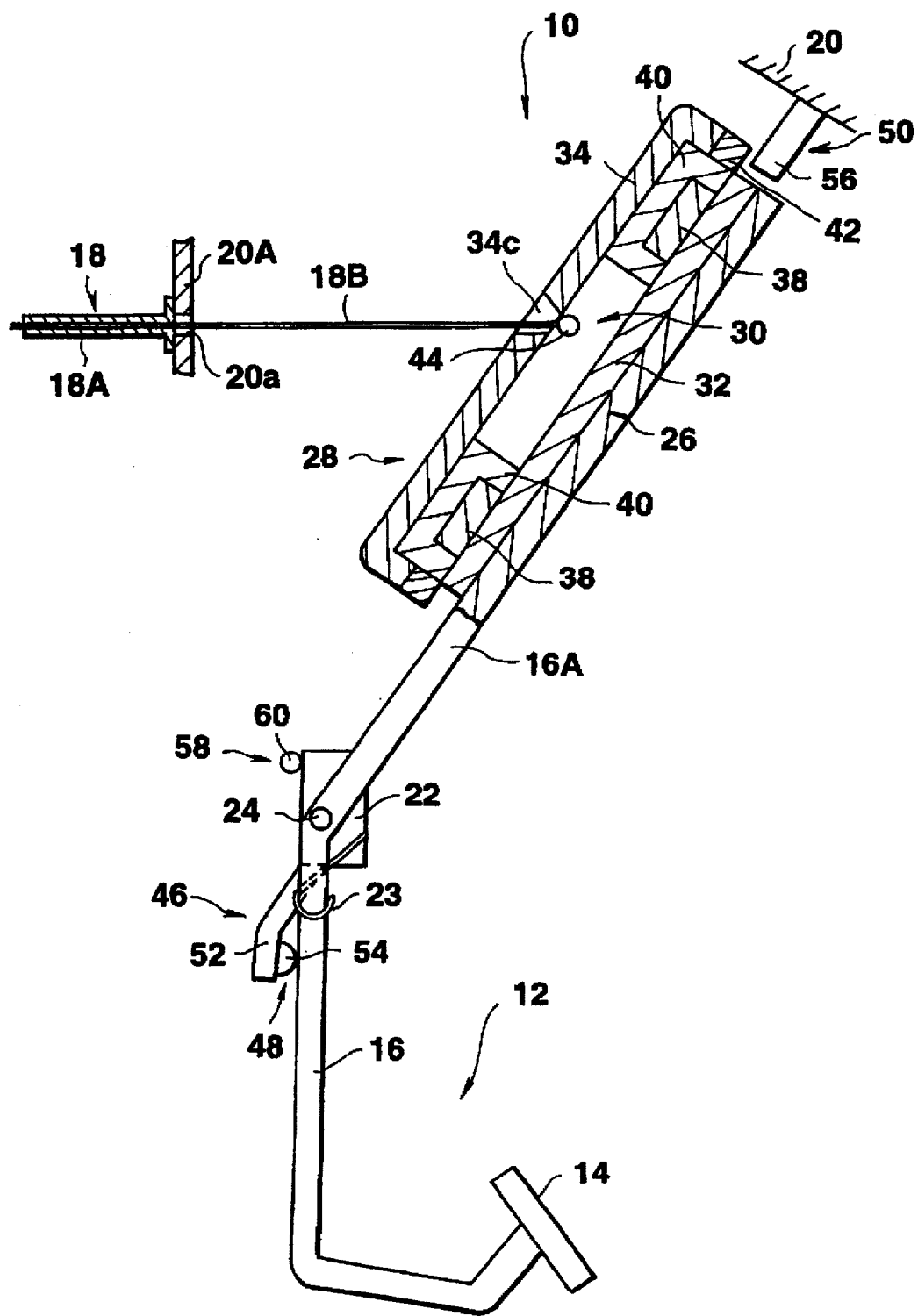
FIG. 17 is a side elevational view of the accelerator system having the device of FIG. 15 moved to the furthermost pedalling position of a normal operation of the accelerator, with a portion taken in section as in FIG. 15.
Figure 18:
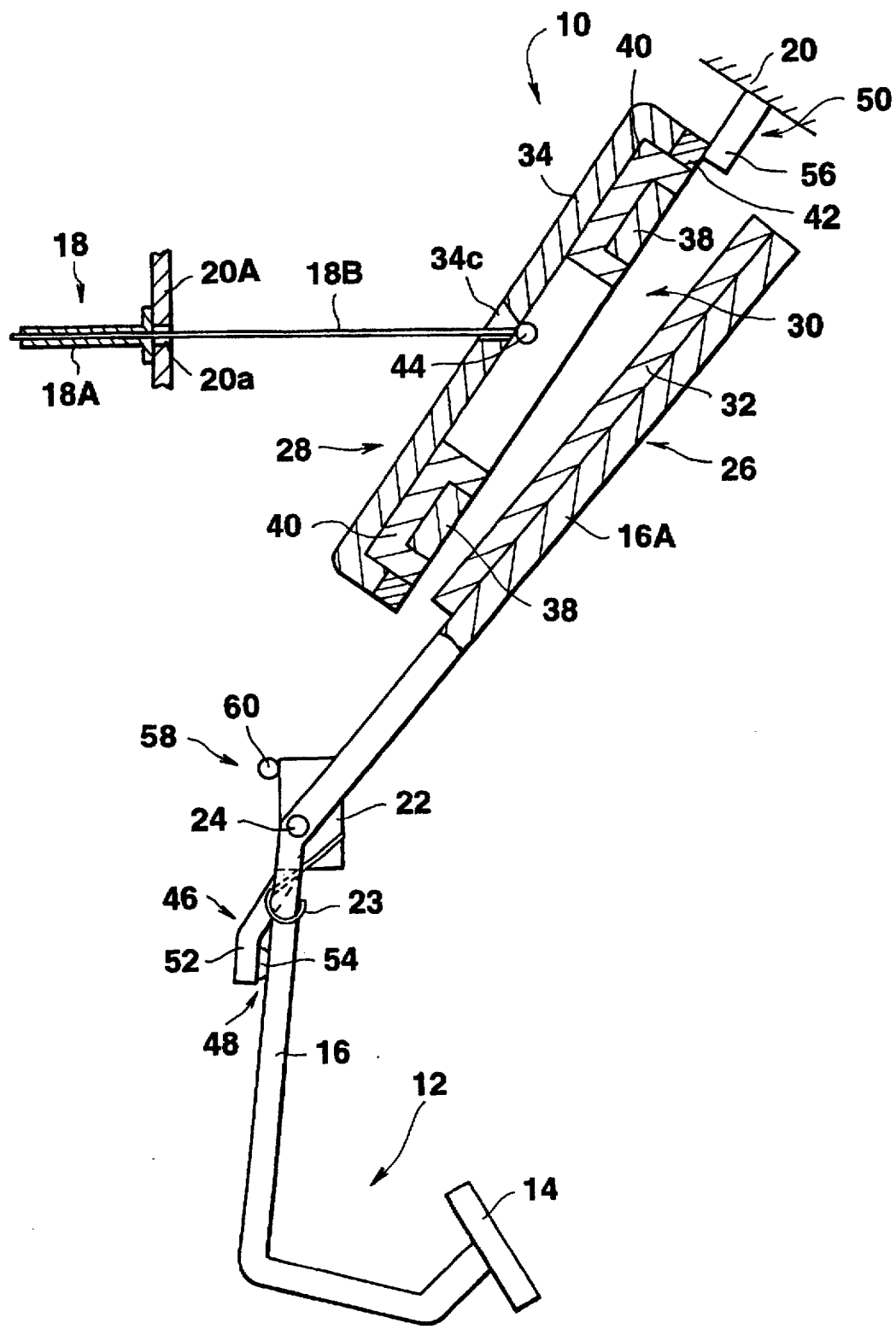
FIG. 18 is a side elevational view of the accelerator system having the device of FIG. 15 moved beyond the furthermost pedalling position of a normal operation of the accelerator to release the magnetic coupling means, with a portion taken in section as in FIG. 15.
Figure 19:
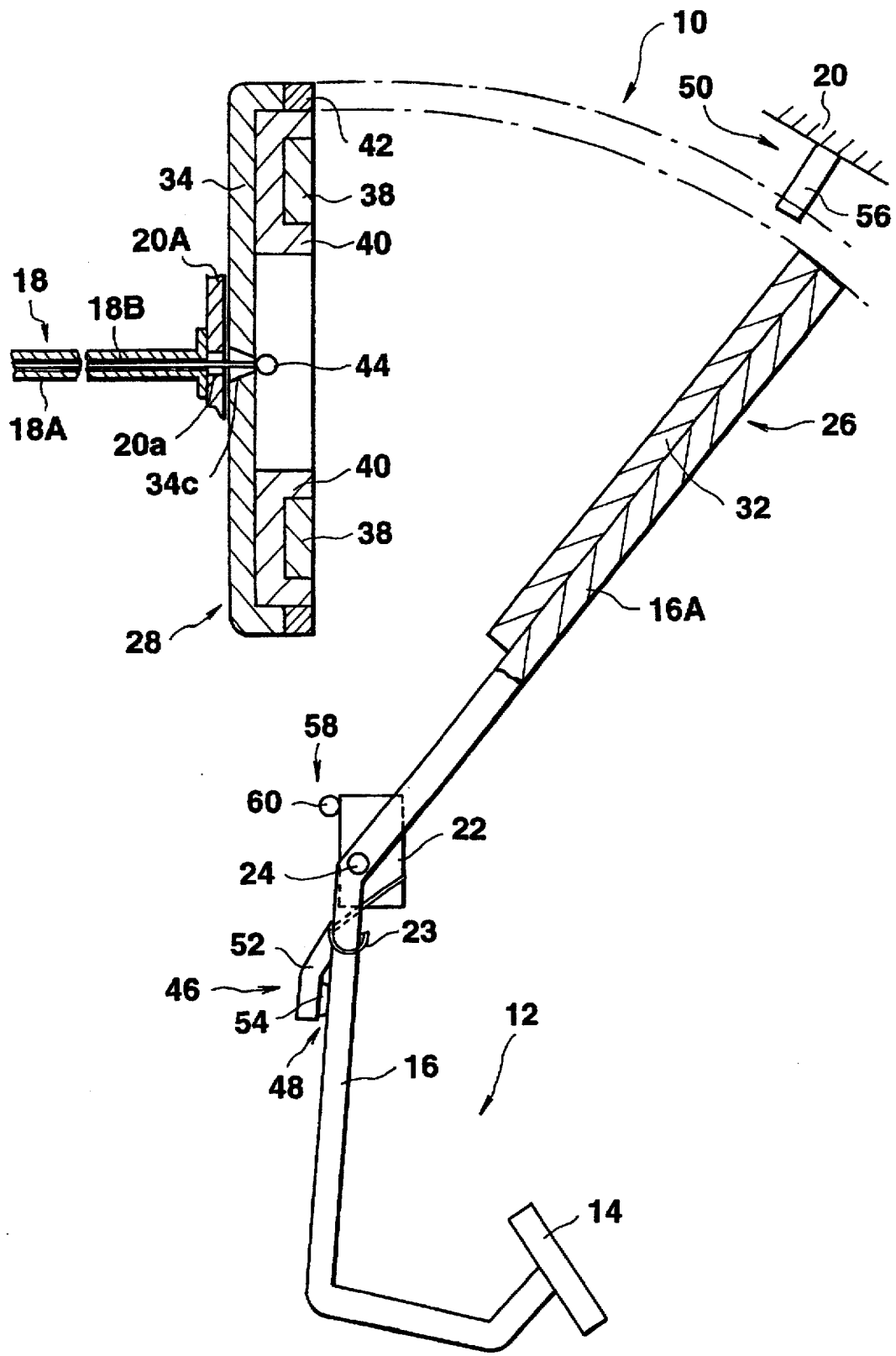
FIG. 19 is a side elevational view of the accelerator system having the device of FIG. 15, an accelerator interlocking member of which is moved in association with an accelerator pedal while a throttle interlocking member is left at the original position by abruptly and erroneously pushing down the accelerator pedal in place of a brake pedal, with a portion taken in section as in FIG. 15.

In the third embodiment, the condition of FIG. 17 corresponds to those of FIG. 3 of the first embodiment and of FIG. 12 of the second embodiment, the condition of FIG. 18 corresponds to those of FIG. 4 of the first embodiment and of FIG. 13 of the second embodiment and the condition of FIG. 19 corresponds to those of FIG. 5 of the first embodiment and of FIG. 14 of the second embodiment.

Figure 15:
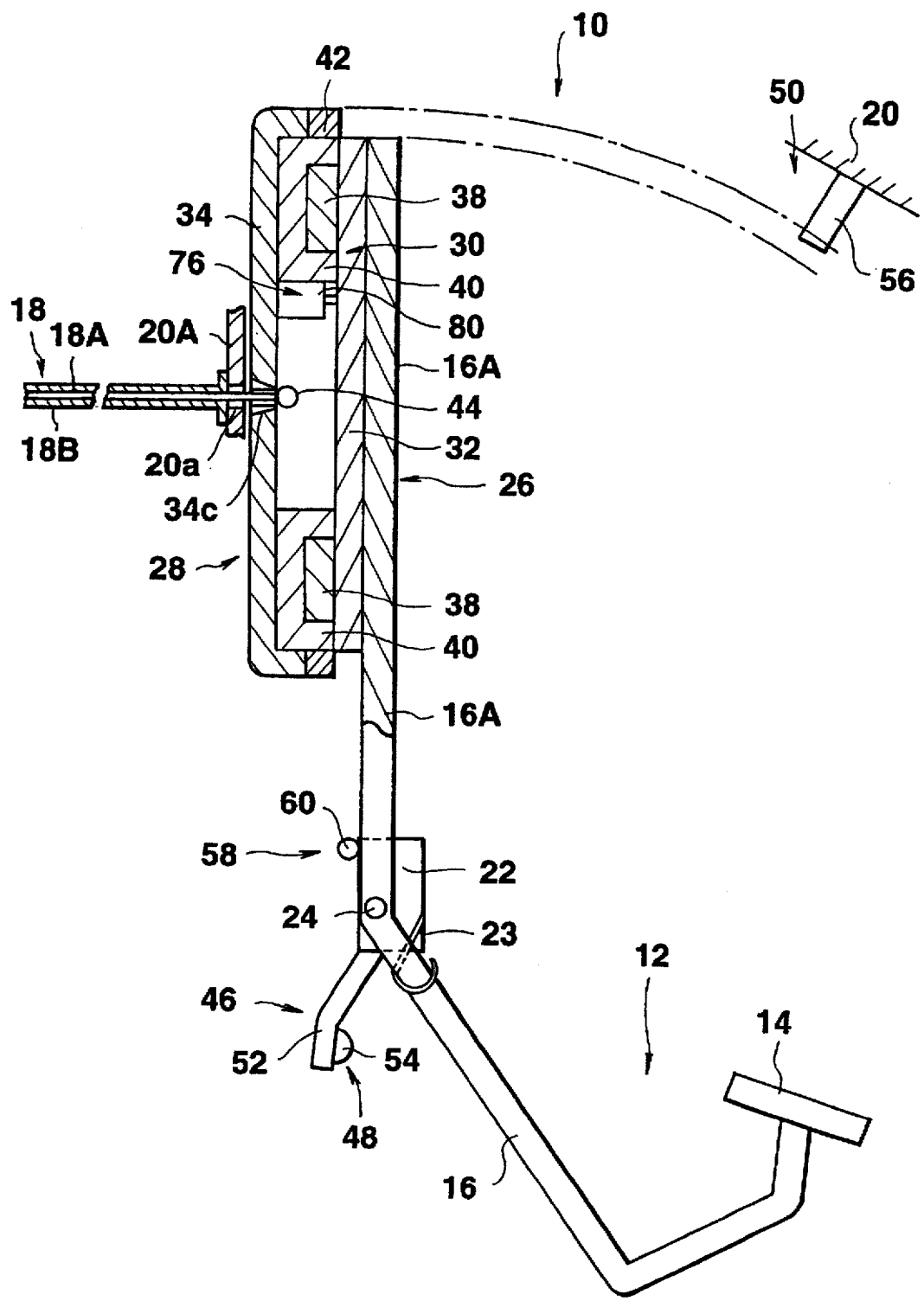
FIG. 15 is a side view of an accelerator system having a device for preventing an accelerator from being erroneously operated in accordance with a third embodiment of the invention, with a portion thereof taken in section.
Figure 16:
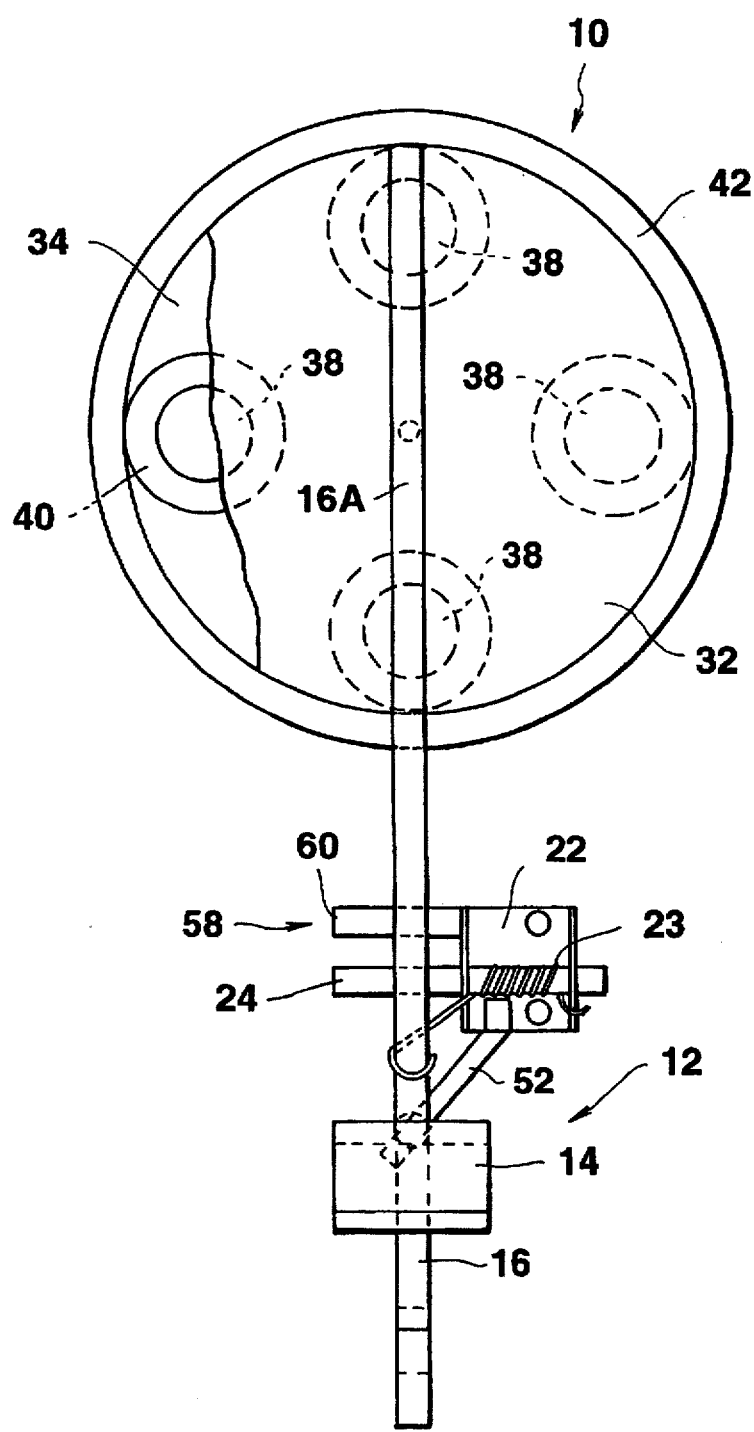
FIG. 16 is a front view of the accelerator system of FIG. 15.

As in the first embodiment, there is provided the erroneous operation warning means 76, only the switching element 80 of which is shown in FIG. 15. The switching element 80 may be connected to the warning circuit not shown in the same manner as in the first embodiment. The erroneous operation warning means 76 is omitted in FIGS. 16 through 19. Although also shown to be omitted in FIGS. 15 through 19, there may be provided lock means to lock the coupling condition of the magnetic coupling means 30.

The accelerator erroneous operation preventing device 10 constructed in accordance with a further embodiment (a fourth embodiment) of the invention is shown in FIGS. 20 through 25. In these figures, the same reference numerals as those of FIGS. 1 through 19 designate the same components.

In the fourth embodiment, the magnetic coupling means 30 is provided on the side of the accelerator arm 16 having the accelerator pedal 14 relative to the support shaft 24, which is different from the first through third embodiments in which the magnetic coupling means 30 is provided on the side of the accelerator arm 16 opposite to the accelerator pedal 14 relative to the support shaft 24.

Figure 21:
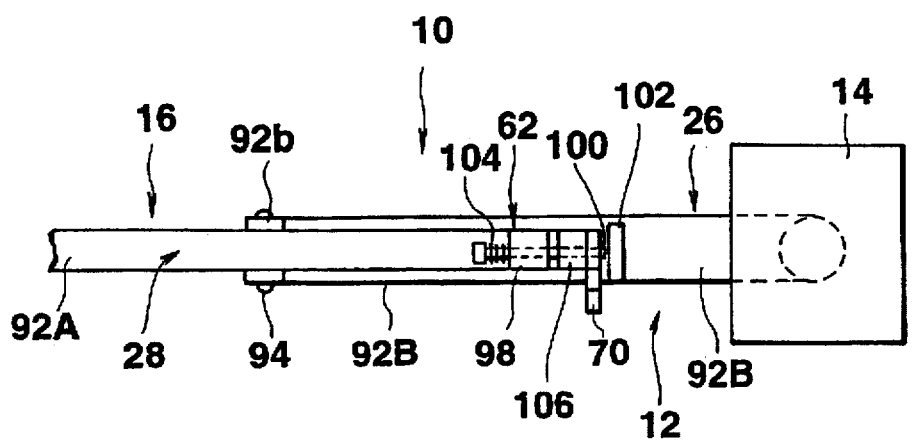
FIG. 21 is a top view of the accelerator system of FIG. 20.

The accelerator arm 16 may comprise a throttle interlocking arm portion 92A pivotally supported on the support shaft 24 and having a free end to which the throttle cable (not shown) is connected and an accelerator interlocking arm portion 92B pivotally mounted by a pin 94 on the throttle interlocking arm portion 92A and having the accelerator pedal 14 mounted thereon. As shown in FIG. 21, a portion 92b of the accelerator interlocking arm portion 92B pivotally mounted on the throttle interlocking arm portion 92A may be in the form of fork and the fork-like end 92b is pivotally mounted by the pin 94 on the throttle interlocking arm portion 92A so as to be disposed on both sides of the arm portion 92A.

The magnetic coupling means 30 may be provided between the throttle interlocking arm portion 92A and the accelerator interlocking arm portion 92B on the side of accelerator pedal 14 relative to the pin 94 which pivotally supports the arm portions 92A and 92B. The magnetic coupling means 30 may comprise a permanent magnet 38 mounted on the throttle interlocking arm portion 92A and a permanent magnet 38A mounted on the accelerator interlocking arm portion 92B so as to face the permanent magnet 38. Therefore, in the illustrated embodiment, the throttle interlocking arm portion 92A constitutes the throttle interlocking member 28 while the accelerator interlocking arm portion 92B constitutes the accelerator interlocking member 26 and the members 26 and 28 are integrally coupled with each other by magnetically attracting them to each other. There may be provided a spring 96 between the throttle interlocking arm portion 92A and the accelerator interlocking arm portion 92B to be pulled toward each other in order to urge the accelerator interlocking arm portion 26 and the throttle interlocking arm portion 28 to be normally integrally coupled with each other by magnetically attracting them to each other by means of the permanent magnets 38 and 38A.

The first stop member 48 of the stop means 46 may comprise a stop body 54 provided on a floor 20B of the vehicle while the second stop member 50 may comprise a rod-like stop body 56 extending from the throttle interlocking arm portion 92A. The accelerator interlocking arm portion 92B engages the stop body 54 of the first stop member 48 at the furthermost pedalling distance of the normal accelerating operation while the stop body 56 of the second stop member 50 engages the floor 20B when the accelerator interlocking member 26 is further moved downwardly while the stop body 54 of the first stop member 48 is deformed by applying to the accelerator pedal 14 the pedalling force equal to or more than the pedalling force applied to the brake pedal.

Figure 20:
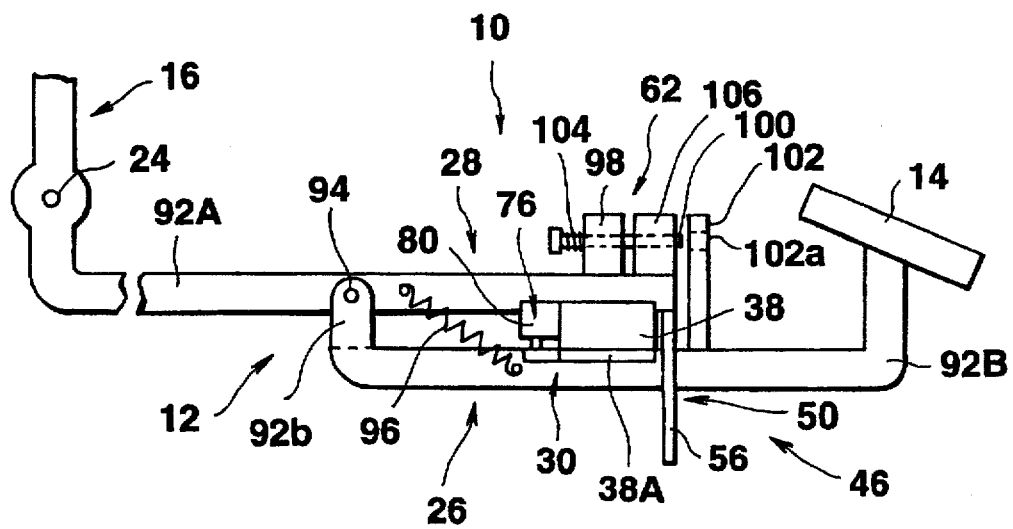
FIG. 20 is a side elevational view of an accelerator system having a device for preventing an accelerator from being erroneously operated in accordance with a fourth embodiment of the invention.
Figure 20:
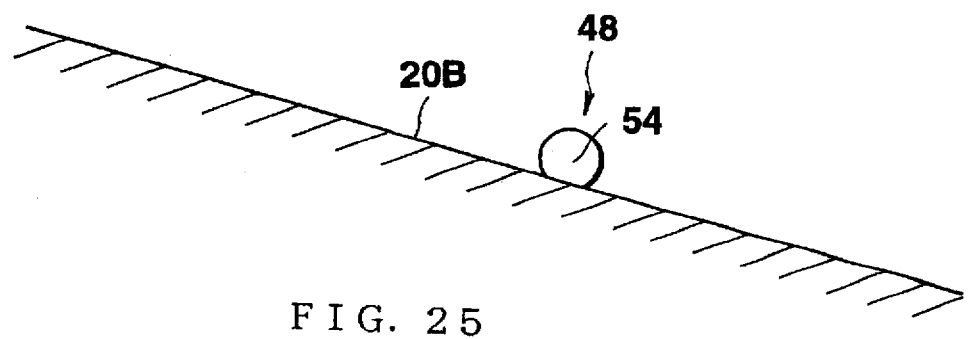
Figure 25:
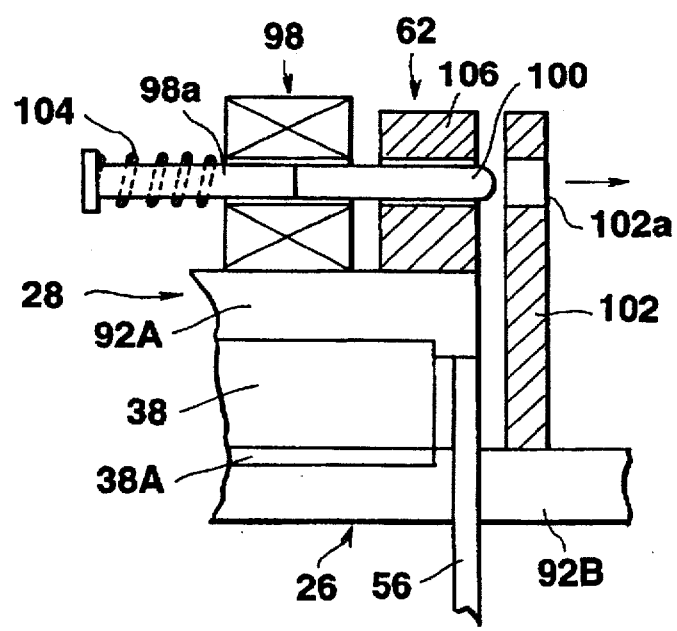
FIG. 25 is an enlarged sectional view of lock means used for the embodiment of FIGS. 20 through 24.

As shown in FIGS. 20 and 25, the lock means 62 may comprise a locking rod 100 integrally provided on the armature 98a of the linear solenoid 98 which is in turn mounted on the throttle interlocking arm portion 92A at the end thereof opposite to the throttle cable and an engaging member 102 integrally provided on the accelerator interlocking member 92B and having an engaging hole 102a provided therein to insert the locking rod 100. A spring 104 serves to hold the locking rod 100 to be removed out of the engaging hole 102a in the engaging member 102 by urging the armature 98a to be normally moved in a leftward direction as viewed in FIG. 25. Therefore, when the linear solenoid 98 is energized, the armature 98a is magnetically attracted against the spring 104 in a rightward direction as viewed in FIG. 25 to insert the locking rod 100 into the engaging hole 102a in the engaging member 102, which causes the accelerator interlocking member 26 and the throttle interlocking member 28 to be integrally locked to each other. In FIGS. 20 and 25, a reference numeral 106 designates a guide member to guide the locking rod 100.

The operation of the accelerator erroneous operation preventing device 10 in accordance with the fourth embodiment is substantially identical to those of the first through third embodiments. However, since an arrangement of the components is different from those of the first through third embodiments, an outline of the operation of the fourth embodiment will be described hereinjustbelow.

Figure 23:
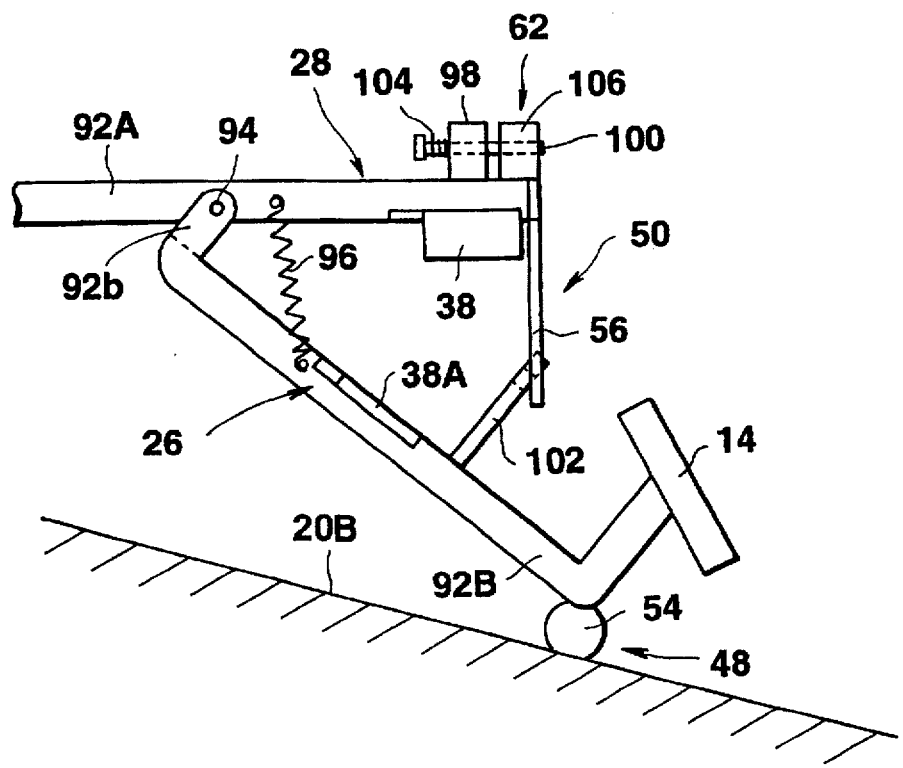
FIG. 23 is a side elevational view of the accelerator system having the device of FIG. 15, an accelerator interlocking member of which is moved in association with an accelerator pedal while a throttle interlocking member is left at the original position by abruptly and erroneously pushing down the accelerator pedal in place of a brake pedal.

FIG. 23 shows the accelerator pedal 14 erroneously pushed down in spite of the brake being intended to be applied while the vehicle is driven with the foot being released from the accelerator pedal 14. In this case, as shown in FIG. 23, the accelerator interlocking arm portion 92B or the accelerator interlocking member 26 is pivotally moved about the pin 94 while the throttle interlocking arm portion 92A or the throttle interlocking member 28 is left almost at the original position so as to release the accelerator interlocking member 26 and the throttle interlocking member 28 from the magnetic coupling condition thereof in accordance with the urging force applied to the throttle cable in a direction in which the throttle valve is opened, the mass of the whole throttle interlocking member 28, the leverage of the accelerator interlocking arm portion 92B and the set magnetic force of the permanent magnets 38 and 38A before the throttle interlocking member 28 is moved together with the accelerator interlocking member 26.

Thus, the throttle cable (not shown) is hardly pulled in spite of the accelerator pedal 14 being erroneously pushed down even though the brake pedal intends to be pushed down and therefore the vehicle is never accelerated.

Figure 22:
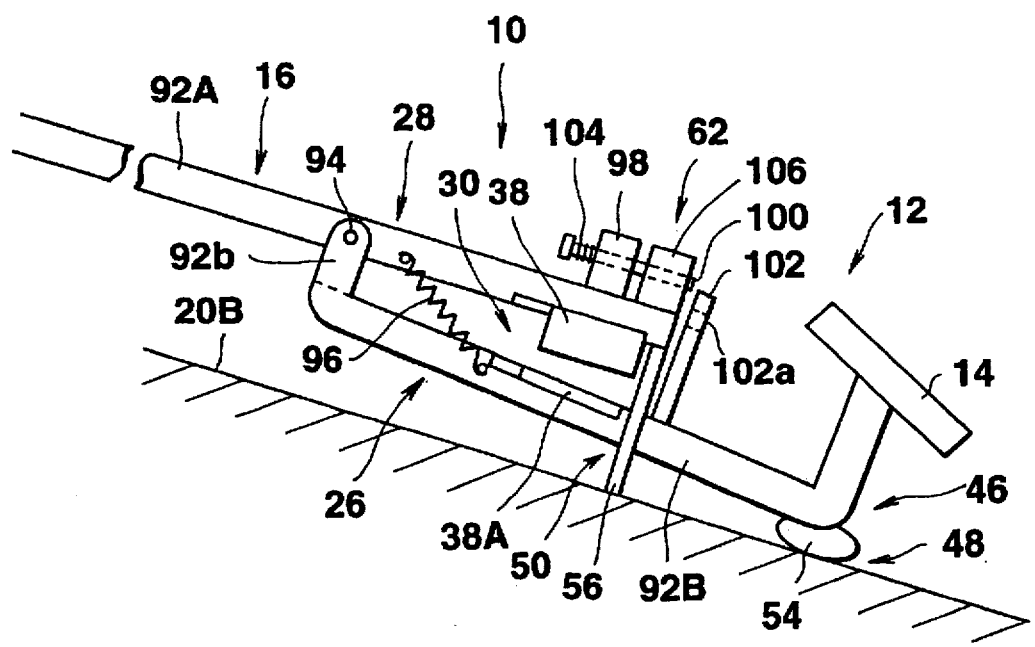
FIG. 22 is a side elevational view of the accelerator system having the device of FIG. 20 erroneously moved beyond the furthermost pedalling position of a normal operation of the accelerator in place of a brake to release the magnetic coupling means.

Next, FIG. 22 shows the accelerator pedal 14 pushed down with the pedalling force equal to or more than the pedalling force applied to the brake pedal, in case that the vehicle is driven while the accelerator is normally operated. In this case, as shown in FIG. 22, although the stop body 56 of the stop member 50 on the throttle interlocking arm portion 92A or the throttle interlocking member 28 is engaged against the floor 20B so as not to be further moved down, the accelerator interlocking arm portion 92B or the accelerator interlocking member 26 can be pushed down while the stop body 54 of the first stop member 48 is deformed. This causes the permanent magnet 38A on the accelerator interlocking member 26 to be released from being magnetically coupled with the permanent magnet 38 on the throttle interlocking member 28. Thus, the throttle interlocking member 28 is immediately returned by the throttle cable normally urging the throttle valve to be closed to the position where the accelerator is released (the position corresponding to one of FIG. 23), which causes the accelerator to be prevented from being erroneously operated.

Since the accelerator interlocking member 26 and the throttle interlocking member 28 are normally integrated with each other by the permanent magnets 38 and 38A, the whole accelerator arm 16 can be pivotally moved in accordance with the pedalling distance of the accelerator pedal 14 while the condition of FIG. 20 is maintained, so that the accelerator is normally operated.

Figure 24:
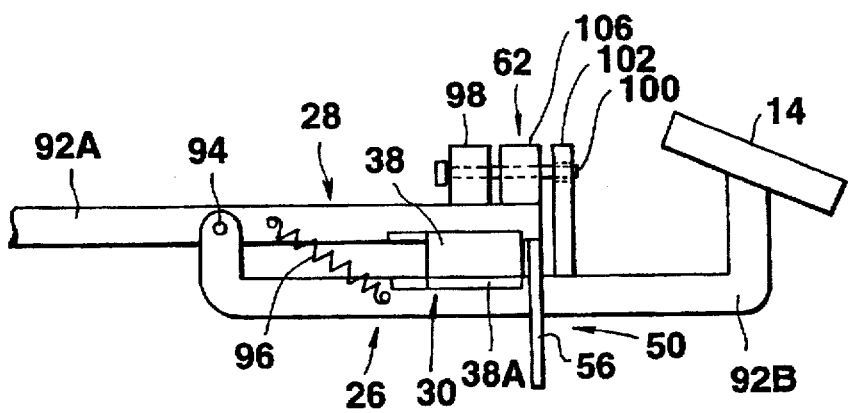
FIG. 24 is a side elevational view of the accelerator system of FIG. 20 similar to FIG. 20, but with lock means being locked.

In case that there is required no consideration of the erroneous operation of the accelerator, the linear solenoid 98 of the lock means 62 is energized to magnetically attract the armature 98a. This causes the locking rod 100 integral to the armature 98a to be inserted into the engaging hole 102a in the engaging member 102 as shown in FIG. 24 so as to integrate the accelerator interlocking member 26 with the throttle interlocking member 28. Thus, since the accelerator arm 16 and the throttle cable 18 are integrally connected with each other, the vehicle can be driven while the accelerator is normally operated.

In the fourth embodiment, the erroneous operation the first embodiment. FIG. 20 shows only the switching element 80 of the erroneous operation warning means 76, which is connected to the warning circuit identical to the warning circuit 82 of the first embodiment. The erroneous operation warning means 76 is shown to be omitted in FIGS. 21 through 24.

Figure 26:
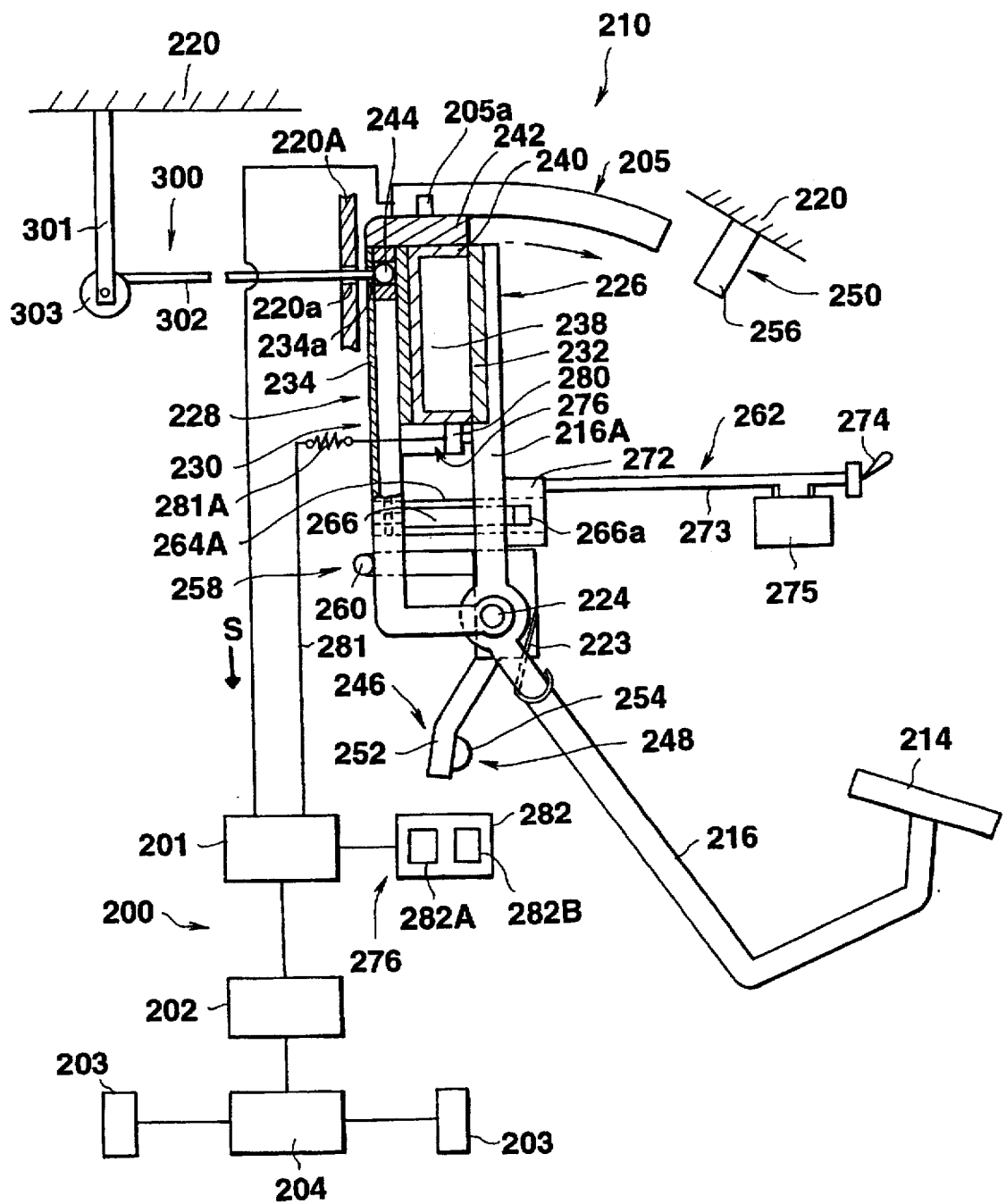
FIG. 26 is a schematic diagram of a device for preventing from being erroneously operated in accordance with an embodiment applied to an electric vehicle, with a main portion thereof partially taken in section.
Figure 27:
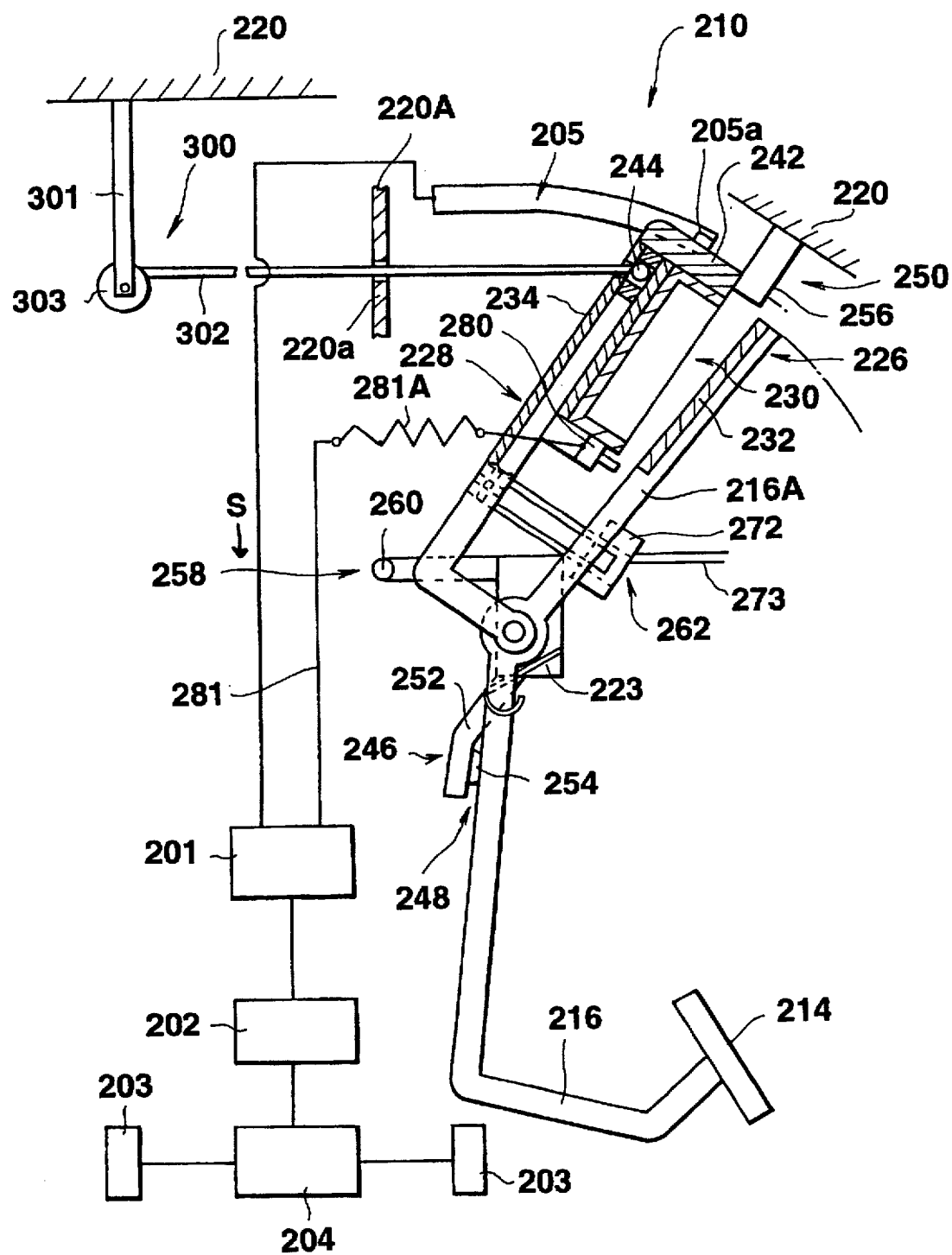
FIG. 27 is a schematic diagram of the device of FIG. 26 having an accelerator pedal in place of a brake pedal being erroneously and abruptly pushed down beyond the furthermost pedalling position of a normal operation of the accelerator and therefore an accelerator interlocking member moved in association with the accelerator pedal while a follower member is left at the original position.
Figure 28:
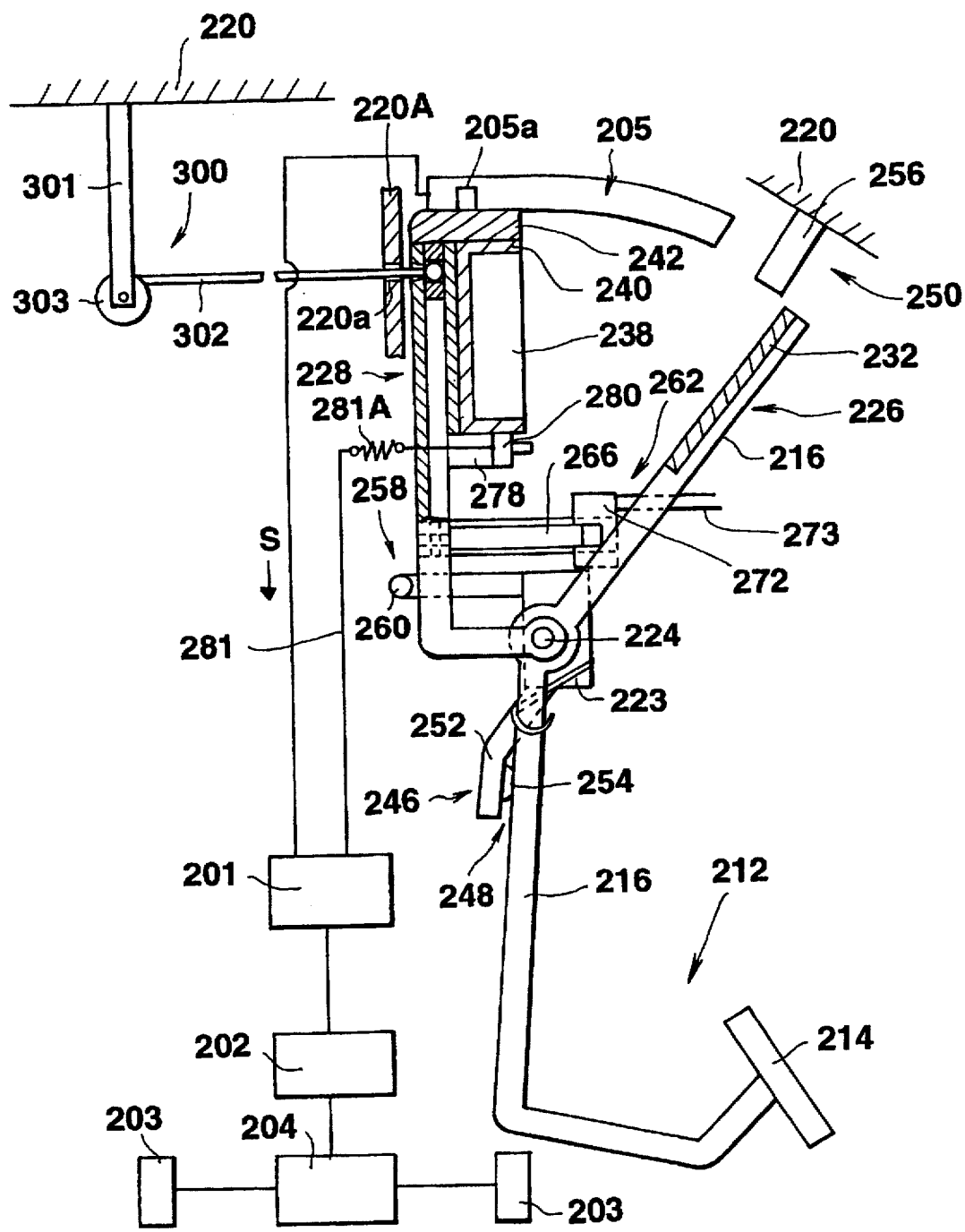
FIG. 28 is a schematic diagram of the device of FIG. 26 in which the accelerator pedal has been erroneously moved beyond the furthermost normal pedalling position to cause release of a magnetic coupling sensor.

An embodiment in which the invention is applied to an electric vehicle is shown in FIG. 26 and the succeeding figures. The electric vehicle 200 comprises an electric motor 202 controlled by a controller 201 and rotatably driven by a battery not shown. Wheels 203 are driven by the electric motor 202 through a differential gear 204.

The controller 201 receives a speed signal S from a variable resistor 205 which is displaced by an accelerator pedal 214 to drive the electric motor 202 at the speed corresponding to the speed signal S. The speed of the electric vehicle may be controlled by a battery system, a pulse width modification system (PWM system) or the like so long as the speed can vary by pushing down the accelerator pedal 214 other than the aforementioned resistance variation system.

An erroneous operation preventing device 210 applied to the electric vehicle may be provided with magnetic coupling sensor means 230 comprising an accelerator interlocking member 226 mounted on an accelerator arm 216 interlocking with the accelerator pedal 214, a follower member 228 urged to be moved in a direction opposite to the pedalling direction of the accelerator pedal 214 (in a leftward direction as viewed in FIG. 26) and magnetically coupled with the accelerator interlocking member 226 to be moved following the accelerator interlocking member 226 and a switch element 280 serving to detect that the accelerator interlocking member 226 is released from being magnetically coupled with the follower member 228 to generate an accelerator erroneous operation signal.

In the illustrated embodiment, the magnetic coupling sensor means 230 may be substantially identical to the magnetic coupling means 30 except that the magnetic coupling sensor means 230 may have the follower means 228 by which the throttle interlocking member 28 of the magnetic coupling means 30 shown in FIGS. 1 through 8 may be replaced and that the switch element 280 is added thereto.

Of course, the accelerator erroneous operation preventing device 210 for the electric vehicle comprises stop means 246 to stop the follower member 228 from further moving beyond the furthermost pedalling position of the normal operation of the accelerator, position control means 258 to control the position of the follower member 228 to stop it from further moving in a leftward direction as viewed in FIG. 26 from the position of FIG. 26, lock means 262 to lock the accelerator interlocking member 226 and the follower member 228 from being released from the magnetic coupling condition thereof when there is required no function of preventing the accelerator from being erroneously operated and erroneous operation warning means to warn to a driver that the accelerator is erroneously operated, which are identical to the stop means 46, the position control means 58, the lock means 62 and the erroneous operation warning means 76 which the device of the first embodiment comprises.

In the illustrated embodiment, the erroneous operation warning means 276 may comprise a warning circuit 282 driven by a signal received from the switch element 280 of the magnetic coupling sensor means 230. The warning circuit 282 may include a warning device 282A such as a buzzer and a speech synthesis system 282B, which are identical to those of the warning circuit 82 of the first embodiment.

Figure 29:
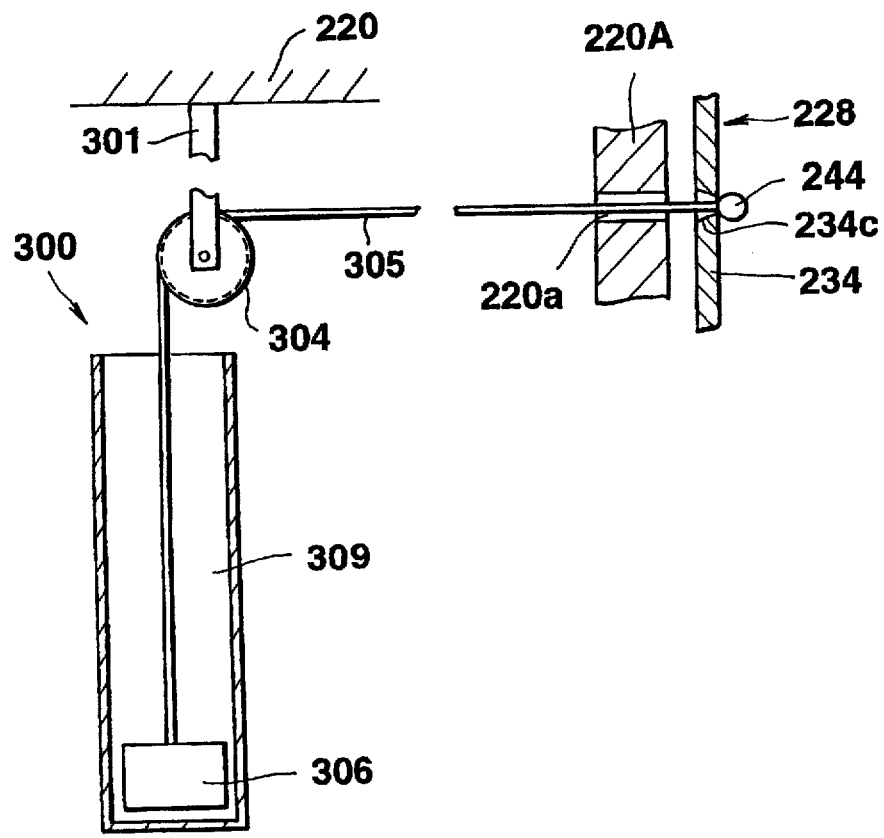
FIG. 29 is an enlarged sectional view of urging means to urge the follower member in a direction opposite to a pedalling direction of the accelerator in accordance with an example different from that of FIG. 26.
Figure 30:
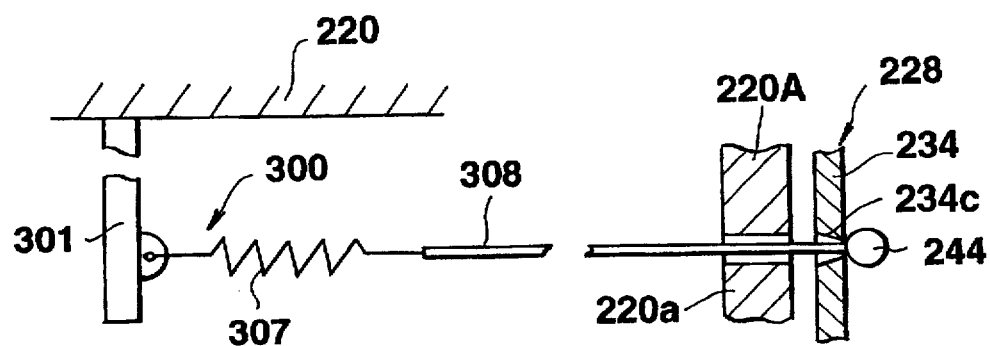
FIG. 30 is an enlarged sectional view of urging means to urge the follower member in a direction opposite to a pedalling direction of the accelerator in accordance with an example further different from that of FIG. 26.

Urging means 300 to urge the follower member 228 in a leftward direction as viewed in FIG. 26 comprises a spring-wound type wire 303 which is formed of wire 302 urged to be wound by a spring and mounted on a flame 301 suspending from a vehicle body 220. As shown in FIG. 29, the urging means 300 may comprise a wire 305 extending through a pully block 304 mounted on the flame 301 and a weight 306 mounted on the end of the wire 305. As shown in FIG. 30, it may comprise a wire 308 connected through a spring 307 to the flame 301. In either of the cases, the front ends of the wires 302, 305 and 308 (the righthand ends as viewed in FIGS. 26, 29 and 30) extend through an extending hole 220a in a wall 220A of the vehicle body and a tapered extending hole 234c in a holder 234 of the follower member 228 and is stopped from being removed out of the holder 234 by a spherical engaging body 244. The urging means 300 of FIG. 29 may comprise a cylindrical guide member 309 secured to the vehicle body 220 by any suitable means to guide the weight 306 only in a vertical direction so as to prevent the weight 306 from being laterally oscillated during the operation of the vehicle. The variable resistor 205 has a wiper 205a mounted on the engaging member 242 of the follower member 228 to make the resistance variable. Thus, the variable resistor 205 generates the speed signal S varying in accordance with the pedalling position of the accelerator pedal 214 and the electric motor 202 is rotatably driven in accordance with the variable speed signal S.

The other corresponding components of the accelerator erroneous operation preventing device 210 to which the invention is applied are designated by reference numerals having "200" added to the corresponding reference numerals of the first embodiment because they are identical to those of the first embodiment and the detail description thereof will be omitted.

Since the operation of the accelerator erroneous operation preventing device 210 which is applied to the electric vehicle 200 is substantially identical to that of the first embodiment except that when the accelerator erroneous operation signal is generated from the switch element 280 of the magnetic coupling sensor means 230 by erroneously operating the accelerator, the controller 201 disables the operation of the electric motor 202, the detailed description thereof will be omitted. When the accelerator pedal 214 is pushed down during the normal operation of the accelerator, the wiper 205a mounted on the engaging body 242 of the follower member 228 is slidably moved, which causes the variable resistor 205 to generate the speed signal S corresponding to the pedalling position of the accelerator pedal 214 and the electric motor 202 to rotate at the speed in accordance with the speed signal, which is different from the first embodiment in which the revolution of the engine is controlled by adjusting the opening degree of the throttle valve in accordance with the pedalling distance of the accelerator pedal 14.

The accelerator erroneous operation preventing device applied to the electric vehicle may be constructed in accordance with any of the second and third embodiments as well as in accordance with the first embodiment shown in FIGS. 1 through 8.

Although any of the magnetic coupling means 30 of the first through fourth embodiments and the magnetic coupling sensor means 230 for the electric vehicle may have the permanent magnets 38, 38A or 238 used therefor, they may be electromagnets. The permanent magnets or the electromagnet may be mounted not on the side of the throttle interlocking member 28 or the follower member 228, but on the side of the accelerator interlocking member 26 or 226 while the attraction plate may be mounted on the throttle interlocking member 28 or the follower member 28. Further, the magnet or magnets may be mounted on both sides of the accelerator interlocking member 26 or 226 and of the throttle interlocking member 28 or the follower member 228.

INDUSTRIAL UTILITY

In this manner, the accelerator erroneous operation preventing device of the present invention never accelerates the engine and the vehicle even though the accelerator pedal is erroneously pushed down because the throttle valve is never opened. More particularly, the accelerator erroneous operation preventing device can immediately stop the throttle valve from being opened without any time delay after the erroneous operation of the accelerator because the accelerator pedal is so arranged that it is disconnected from the operating side of the throttle valve. Also, the accelerator erroneous operation preventing device can prevent the accelerator from being erroneously operated almost while the throttle valve is kept closed in accordance with the operation of initiating to erroneously push down the accelerator pedal.

Furthermore, when the accelerator of the electric vehicle is erroneously operated, the erroneous operation signal is supplied to the controller to prevent the erroneous operation. In many cases, the electric vehicle is driven without contacting the accelerator pedal, which will be different from the engine mounting vehicle, and therefore the magnetic coupling sensor means can generate the erroneous operation signal immediately after the accelerator pedal is initially pushed down from the original position, which causes the accelerator to be effectively prevented from being erroneously operated without any acceleration of the electric motor.

Furthermore, in any case, as the accelerator pedal is released from the foot of the driver, who notices the erroneous operation of the accelerator, the accelerator system can be immediately returned to the original normal condition and thereafter the accelerator can be again normally operated.

The erroneous operation preventing device of the invention can be commercially available as an independent assembly together with the accelerator pedal, which allows them to be easily assembled in the existing vehicles.

I claim:

1. A device for preventing an accelerator from being erroneously operated for a motor vehicle comprising magnetic coupling means including an accelerator interlocking member interlocking with an accelerator pedal (14) of said motor vehicle and a throttle interlocking member associated with a throttle valve so as to open and close said throttle valve and being magnetically coupled with said accelerator interlocking member, said magnetic coupling means being so magnetically set that said accelerator interlocking member is released from said throttle interlocking member as soon as a pedalling force equal to or more than a pedalling force applied to a brake pedal is abruptly applied to said accelerator pedal.

2. A device for preventing an accelerator from being erroneously operated for a motor vehicle as set forth in claim 1, and either of said accelerator interlocking member and said throttle interlocking member of said magnetic coupling means include magnetic material or a magnet while the other includes a magnet.

3. A device for preventing an accelerator from being erroneously operated for a motor vehicle as set forth in claim 1, and further comprising lock means to releasably lock the magnetic coupling condition of said accelerator interlocking member and said throttle interlocking member.

4. A device for preventing an accelerator from being erroneously operated for a motor vehicle as set forth in claim 1, and wherein an accelerator arm having said accelerator pedal mounted thereon is pivotally mounted on a vehicle body and said magnetic coupling means is provided on a side of said accelerator arm opposite to said accelerator pedal relative to a pivotal point of said accelerator arm.

5. A device for preventing an accelerator from being erroneously operated for a motor vehicle as set forth in claim 1, and wherein an accelerator arm having said accelerator pedal mounted thereon is pivotally mounted on a vehicle body and said magnetic coupling means is provided on a side of said accelerator arm having said accelerator pedal relative to a pivotal point of said accelerator arm.

6. A device for preventing an accelerator from being erroneously operated for a motor vehicle as set forth in claim 1, and further comprising erroneous operation warning means to warn the erroneous operation of said accelerator, said erroneous operation warning means including switch means to detect that said accelerator interlocking member and said throttle interlocking member are released from the magnetic coupling condition and a warning circuit to warn the erroneous operation of the accelerator in accordance with a signal generated by said switch means to detect said release from said magnetic coupling condition.

7. A device for preventing an accelerator from being erroneously operated for a motor vehicle comprising magnetic coupling means including an accelerator interlocking member interlocking with an accelerator pedal of said motor vehicle and a throttle interlocking member associated with a throttle valve so as to open and close said throttle valve and being magnetically coupled with said accelerator interlocking member and stop means including a stop body formed of deformable material serving to stop said accelerator interlocking member from further moving beyond the furthermost pedalling position of the normal operation of said accelerator when said accelerator interlocking member moves without deforming said stop body, but to allow said accelerator interlocking member to move beyond said furthermost pedalling position of the normal operation of said accelerator to allow said accelerator interlocking member and said throttle interlocking member to be released from being coupled with each other when said accelerator interlocking member moves beyond said furthermost pedalling position and said stop body is deformed.

8. A device for preventing an accelerator from being erroneously operated for a motor vehicle as set forth in claim 7, wherein either of said accelerator interlocking member and said throttle interlocking member of said magnetic coupling means include magnetic material or a magnet and the other includes a magnet.

9. A device for preventing an accelerator from being erroneously operated for a motor vehicle as set forth in claim 7, and said magnetic coupling means being so magnetically set that said accelerator interlocking member is released from said throttle interlocking member as soon as a pedalling force equal to or more than a pedalling force applied to a brake pedal is abruptly applied to said accelerator pedal.

10. A device for preventing an accelerator from being erroneously operated for a motor vehicle as set forth in claim 7, further comprising a second stop member serving to stop moving of said throttle interlocking member so that it is released from being magnetically coupled with said accelerator interlocking member without any further movement of said throttle interlocking member in the accelerating direction while said first stop member is deformed when said accelerator pedal is pushed down beyond said furthermost pedalling position in the normal operation of said accelerator.

11. A device for preventing an accelerator from being erroneously operated for a motor vehicle as set forth in claim 10, and said first stop member is formed of resilient material to be deformed by pushing down said accelerator pedal beyond the normal operation of said accelerator.

12. A device for preventing an accelerator from being erroneously operated for a motor vehicle as set forth in claim 10, and said first stop member is formed of plastically deformable material to be plastically deformed to allow said accelerator interlocking member to be moved to a position where said accelerator interlocking member is released from being magnetically coupled with said throttle interlocking member by pushing down said accelerator pedal beyond the normal operation of said accelerator.

13. A device for preventing an accelerator from being erroneously operated for a motor vehicle as set forth in claim 7, further comprising guide means to to guide linear forward and backward movement of said accelerator interlocking member while it is coupled to said throttle interlocking member.

14. A device for preventing an accelerator from being erroneously operated for a motor vehicle as set forth in claim 7, and further comprising lock means to lock said accelerator interlocking member and said throttle interlocking member when coupled.

15. A device for preventing an accelerator from being erroneously operated for a motor vehicle as set forth in claim 7, wherein an accelerator arm having said accelerator pedal mounted thereon is pivotally mounted on a vehicle body and said magnetic coupling means is provided on a side of said accelerator arm opposite to said accelerator pedal relative to a pivotal point of said accelerator arm.

16. A device for preventing an accelerator from being erroneously operated for a motor vehicle as set forth in claim 7, and wherein an accelerator arm having said accelerator pedal mounted thereon is pivotally mounted on a vehicle body and said magnetic coupling means is provided on a side of said accelerator arm having said accelerator pedal relative to a pivotal point of said accelerator arm.

17. A device for preventing an accelerator from being erroneously operated for a motor vehicle as set forth in claim 7, and further comprising erroneous operation warning means to warn the erroneous operation of said accelerator, said erroneous operation warning means including switch means to detect that said accelerator interlocking member and said throttle interlocking member are released from the magnetic coupling condition thereof and a warning circuit to warn the erroneous operation of said accelerator in accordance with a signal generated by said switch means to detect said release from said magnetic coupling condition.

18. A device for preventing an accelerator from being erroneously operated for an electric vehicle characterized by comprising magnetic coupling sensor means including an accelerator interlocking member interlocking with an accelerator pedal of said electric vehicle, a follower member urged to be moved in a direction opposite to an accelerating direction of said accelerator pedal and being magnetically coupled with said accelerator interlocking member to move following said accelerator interlocking member and a switch element to detect that said accelerator interlocking member and said follower member are released from being magnetically coupled with each other to generate an accelerator erroneous operation signal, said magnetic coupling sensor means being so magnetically set that said accelerator interlocking member is released from said follower member as soon as a pedalling force equal to or more than a pedalling force applied to a brake pedal is abruptly applied to said accelerator pedal and being connected to a controller of said electric vehicle so that said accelerator erroneous operation signal from said switch element serves to prevent said controller from controlling said electric vehicle in an accelerating direction thereof.

19. A device for preventing an accelerator from being erroneously operated for an electric vehicle as set forth in claim 18, and either of said accelerator interlocking member and said follower member for said magnetic coupling sensor means includes magnetic material or a magnet while the other includes a magnet.

20. A device for preventing an accelerator from being erroneously operated for an electric vehicle as set forth in claim 18, and further comprising lock means to releasably lock the magnetic coupling condition of said accelerator interlocking member and said follower member.

21. A device for preventing an accelerator from being erroneously operated for an electric vehicle as set forth in claim 18, and wherein an accelerator arm having said accelerator pedal mounted thereon is pivotally mounted on a vehicle body and said magnetic coupling sensor means is provided on a side of said accelerator arm opposite to said accelerator pedal relative to a pivotal point of said accelerator arm.

22. A device for preventing an accelerator from being erroneously operated for an electric vehicle as set forth in claim 18, and wherein an accelerator arm having said accelerator pedal mounted thereon is pivotally mounted on a vehicle body and said magnetic coupling sensor means is provided on a side of said accelerator arm having said accelerator pedal relative to a pivotal point of said accelerator arm.

23. A device for preventing an accelerator from being erroneously operated for an electric vehicle as set forth in claim 18, and further comprising erroneous operation warning means to warn the erroneous operation of said accelerator, said erroneous operation warning means including switch means to detect that said accelerator interlocking member and said follower member are released from the magnetic coupling condition thereof and a warning circuit to warn the erroneous operation of said accelerator in accordance with a signal generated by said switch means to detect said release from the magnetic coupling condition.

24. A device for preventing an accelerator from being erroneously operated for an electric vehicle comprising magnetic coupling sensor means including an accelerator interlocking member interlocking with an accelerator pedal of said electric vehicle and a follower member urged to be moved in a direction opposite to an accelerating direction of said accelerator pedal and being magnetically coupled with said accelerator interlocking member to move following said accelerator interlocking member and stop means including a stop body formed of deformable material serving to stop said follower member from further moving beyond the furthermost pedalling position of the normal operation of said accelerator when said accelerator interlocking member moves without deforming said stop body, but to allow said accelerator interlocking member to move beyond said furthermost pedalling position of the normal operation of said accelerator to allow said accelerator interlocking member and said follower member to be released from being magnetically coupled with each other when said accelerator interlocking member moves beyond said furthermost pedalling position and said stop body is deformed.

25. A device for preventing an accelerator from being erroneously operated for an electric vehicle as set forth in claim 24, wherein either of said accelerator interlocking member and said follower member of said magnetic coupling sensor means includes magnetic material or a magnet and the other includes a magnet.

26. A device for preventing an accelerator from being erroneously operated for an electric vehicle as set forth in claim 24, and said magnetic coupling sensor means being so magnetically set that said accelerator interlocking member is released from said follower member as soon as a pedalling force equal to or more than a pedalling force applied to a brake pedal is abruptly applied to said accelerator pedal.

27. A device for preventing an accelerator from being erroneously operated for an electric vehicle as set forth in claim 24, further comprising a second stop member (250) serving to stop moving of said follower member so that it is released from being magnetically coupled with said accelerator interlocking member without any further movement of said follower member in the accelerating direction while said first stop member is deformed when said accelerator pedal is pushed down beyond said furthermost pedalling position in the normal operation of said accelerator.

28. A device for preventing an accelerator from being erroneously operated for an electric vehicle as set forth in claim 27, and said first stop member is formed of resilient material to be deformed by pushing down said accelerator pedal beyond the furthermost pedalling position in the the normal operation of said accelerator.

29. A device for preventing an accelerator from being erroneously operated for an electric vehicle as set forth in claim 27, and said first stop member is formed of plastically deformable material to be plastically deformed to allow said accelerator interlocking member to be moved to a position where said accelerator interlocking member is released from being coupled with said follower member by pushing down said accelerator pedal beyond the furthermost pedalling position in the normal operation of said accelerator.

30. A device for preventing an accelerator from being erroneously operated for an electric vehicle as set forth in claim 24, and further comprising lock means to lock said accelerator interlocking member and said follower member from being uncoupled from each other.

31. A device for preventing an accelerator from being erroneously operated for an electric vehicle as set forth in claim 24, and wherein an accelerator arm having said accelerator pedal mounted thereon is pivotally mounted on a vehicle body and said magnetic coupling sensor means is provided on a side of said accelerator arm opposite to said accelerator pedal relative to a pivotal point of said accelerator arm.

32. A device for preventing an accelerator from being erroneously operated for an electric vehicle as set forth in claim 24, and wherein an accelerator arm having said accelerator pedal mounted thereon is pivotally mounted on a vehicle body and said magnetic coupling sensor means is provided on a side of said accelerator arm having said accelerator pedal relative to a pivotal point of said accelerator arm.

33. A device for preventing an accelerator from being erroneously operated for an electric vehicle as set forth in claim 24, and further comprising erroneous operation warning means to warn the erroneous operation of said accelerator, said erroneous operation warning means including a warning circuit to warn the erroneous operation of said accelerator in accordance with a signal generated by switch means to detect said release from the magnetic coupling condition.

* * * * *